US011772603B2

(12) United States Patent
Brown et al.

(10) Patent No.: US 11,772,603 B2
(45) Date of Patent: Oct. 3, 2023

(54) PASSENGER AUTHENTICATION AND ENTRY FOR AUTONOMOUS VEHICLES

(71) Applicant: Motional AD LLC, Boston, MA (US)

(72) Inventors: Robert Brown, South Hamilton, MA (US); Dexter Stoltz, Emsworth, PA (US); Adam-Ridgely Khaw, Roslindale, MA (US); Linh Pham, Cambridge, MA (US); Sean Beaudette, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/324,055

(22) Filed: May 18, 2021

(65) Prior Publication Data

US 2022/0371544 A1    Nov. 24, 2022

(51) Int. Cl.
*B60R 25/102* (2013.01)
*B60R 25/01* (2013.01)
(Continued)

(52) U.S. Cl.
CPC .......... *B60R 25/102* (2013.01); *B60R 25/01* (2013.01); *B60R 25/23* (2013.01); *B60R 25/252* (2013.01);
(Continued)

(58) Field of Classification Search
CPC .......... G08G 1/00; G08G 1/048; G08G 1/20; G08G 1/202; G08G 1/205; G05D 1/00;
(Continued)

(56) References Cited

U.S. PATENT DOCUMENTS

| 3,883,843 | A | 5/1975 | Telmet |
| 5,519,260 | A | 5/1996 | Washington |

(Continued)

FOREIGN PATENT DOCUMENTS

| CN | 107757616 | 3/2018 |
| CN | 107914713 | 4/2018 |

(Continued)

OTHER PUBLICATIONS

NPL Search.*

(Continued)

*Primary Examiner* — Van T Trieu
(74) *Attorney, Agent, or Firm* — Fish & Richardson P.C.

(57) ABSTRACT

Methods, apparatus, and systems for passenger authentication and entry for autonomous vehicles are disclosed. A vehicle receives information over a first communication channel from a first mobile device. The information specifies a geographical location. The information causes the vehicle to arrive at the geographical location. The vehicle transmits a first message to a second mobile device indicating that the vehicle has arrived at the geographical location. The first message includes a graphical icon representing the vehicle. The graphical icon is for display on a user interface of the second mobile device. The vehicle receives a second message from the second mobile device over a second communication channel. The second message indicates that the graphical icon was dragged across the user interface into a graphical receptacle displayed on the user interface. Responsive to receiving the second message, at least one door of the vehicle is unlocked.

20 Claims, 14 Drawing Sheets

(51) Int. Cl.
*B60R 25/23* (2013.01)
*B60R 25/25* (2013.01)
*B60R 25/30* (2013.01)
*G06F 3/01* (2006.01)
*G06F 3/0486* (2013.01)

(52) U.S. Cl.
CPC ............ *B60R 25/305* (2013.01); *G06F 3/016* (2013.01); *G06F 3/0486* (2013.01); *B60R 2325/101* (2013.01); *B60R 2325/103* (2013.01); *B60R 2325/205* (2013.01)

(58) Field of Classification Search
CPC ...... G05D 1/0033; G05D 1/02; G05D 1/0276; G07C 5/0866; G07C 5/08; B60W 60/00; B60W 30/001; H04W 4/00; H04W 4/02; H04W 4/029; H04W 4/23
See application file for complete search history.

(56) References Cited

U.S. PATENT DOCUMENTS

| | | | |
|---|---|---|---|
| 7,568,616 B2 | 8/2009 | Zuili | |
| 9,123,186 B2 | 9/2015 | Ricci | |
| 9,881,474 B2 | 1/2018 | Fadell et al. | |
| 9,950,708 B1 | 4/2018 | Cullinane et al. | |
| 9,978,238 B2 | 5/2018 | Fadell et al. | |
| 9,990,788 B2 | 6/2018 | Malhotra | |
| 10,349,223 B1 | 7/2019 | Yoo et al. | |
| 10,482,226 B1 | 11/2019 | Konrardy et al. | |
| 10,685,503 B2 | 6/2020 | Ricci | |
| 11,097,690 B2 | 8/2021 | Dumov | |
| 11,163,300 B2* | 11/2021 | Engle | G05D 1/0088 |
| 2007/0132950 A1 | 6/2007 | Victor | |
| 2013/0317693 A1 | 11/2013 | Jefferies | |
| 2014/0309806 A1 | 10/2014 | Ricci | |
| 2015/0185030 A1* | 7/2015 | Monroe | B60W 50/14 701/532 |
| 2015/0339928 A1 | 11/2015 | Ramanujam | |
| 2016/0301698 A1 | 10/2016 | Katara | |
| 2017/0115125 A1 | 4/2017 | Outwater et al. | |
| 2017/0132934 A1 | 5/2017 | Kentley et al. | |
| 2017/0137032 A1 | 5/2017 | Wuthnow | |
| 2017/0147959 A1 | 5/2017 | Sweeny et al. | |
| 2017/0153714 A1 | 6/2017 | Gao et al. | |
| 2017/0199522 A1* | 7/2017 | Li | G07C 5/0866 |
| 2017/0259785 A1 | 9/2017 | Lovett et al. | |
| 2017/0294130 A1 | 10/2017 | Donnelly | |
| 2017/0327082 A1 | 11/2017 | Kamhi | |
| 2018/0048769 A1 | 2/2018 | Alshinnawi et al. | |
| 2018/0074494 A1 | 3/2018 | Myers | |
| 2018/0074495 A1 | 3/2018 | Myers | |
| 2018/0075754 A1 | 3/2018 | Salter et al. | |
| 2018/0103414 A1 | 4/2018 | Golsch | |
| 2018/0120123 A1 | 5/2018 | Seok et al. | |
| 2018/0136655 A1 | 5/2018 | Kim et al. | |
| 2018/0188731 A1 | 7/2018 | Matthiesen et al. | |
| 2018/0229689 A1 | 8/2018 | Brown | |
| 2018/0236975 A1 | 8/2018 | Myers et al. | |
| 2018/0290627 A1* | 10/2018 | Hariri | B60R 25/245 |
| 2018/0354363 A1 | 12/2018 | Rolfes et al. | |
| 2019/0041223 A1 | 2/2019 | Yang et al. | |
| 2019/0137290 A1* | 5/2019 | Levy | B60Q 1/50 |
| 2019/0172279 A1 | 6/2019 | Al-Shaikh | |
| 2019/0188493 A1 | 6/2019 | Tiziani et al. | |
| 2019/0311417 A1* | 10/2019 | Randisi | G06Q 50/30 |
| 2019/0318159 A1 | 10/2019 | Blanc-Paques et al. | |
| 2019/0379683 A1 | 12/2019 | Overby et al. | |
| 2020/0008061 A1 | 1/2020 | Schroeder et al. | |
| 2020/0010051 A1 | 1/2020 | Dumov et al. | |
| 2020/0027091 A1 | 1/2020 | Hassani et al. | |
| 2020/0035049 A1 | 1/2020 | Mottla et al. | |
| 2020/0223396 A1 | 7/2020 | Yi et al. | |
| 2020/0225663 A1 | 7/2020 | Matthiesen et al. | |
| 2020/0238952 A1 | 7/2020 | Lindsay et al. | |
| 2020/0238953 A1 | 7/2020 | Spasovski et al. | |
| 2021/0258796 A1* | 8/2021 | Li | H04W 4/24 |
| 2021/0339708 A1 | 11/2021 | Dumov | |

FOREIGN PATENT DOCUMENTS

| | | |
|---|---|---|
| KR | 2016-0088264 | 7/2016 |
| KR | 101850741 | 4/2018 |
| WO | WO 2002089077 | 11/2002 |
| WO | WO 2014172320 | 10/2014 |
| WO | WO 2014172369 | 10/2014 |
| WO | WO 2015099679 | 7/2015 |
| WO | WO 2015200224 | 12/2015 |
| WO | WO 2016019474 | 2/2016 |
| WO | WO 2016032990 | 3/2016 |
| WO | WO 2016109838 | 7/2016 |
| WO | WO 2016109839 | 7/2016 |
| WO | WO 2017006268 | 1/2017 |
| WO | WO 2017079222 | 5/2017 |
| WO | WO 2017205961 | 12/2017 |
| WO | WO 2019140528 | 7/2019 |
| WO | WO 2019191417 | 10/2019 |
| WO | WO 2019191427 | 10/2019 |
| WO | WO 2019237072 | 12/2019 |
| WO | WO 2019241801 | 12/2019 |
| WO | WO 2020072583 | 4/2020 |
| WO | WO 2020101720 | 5/2020 |

OTHER PUBLICATIONS

[No Author Listed], "SAE: Surface Vehicle Recommended Practice, Taxonomy and Definitions for Terms Related to Driving Automation Systems for On-Road Motor Vehicles," SAE International, Sep. 30, 2016, 30 pages.
DK 1st Technical Examination Report in Danish Appln. No. PA201870683, dated Jan. 21, 2019, 9 pages.
DK 2nd Technical Examination Report in Danish Appln. No. PA201870683, dated Jul. 8, 2019, 3 pages.
DK 3rd Technical Examination Report in Danish Appln. No. PA201870683, dated Jun. 4, 2020, 3 pages.
DK 4th Technical Examination Report in Danish Appln. No. PA 2018 70683, dated Feb. 8, 2021, 3 pages.
EP Extended Search Report and Written Opinion in European Application No. 19184136, dated Aug. 1, 2019, 12 pages.
Hayashi et al., "Carsharing and IT Enabled Services", Annual SRII Global Conference, IEEE, pp. 274-280, 2014.

* cited by examiner

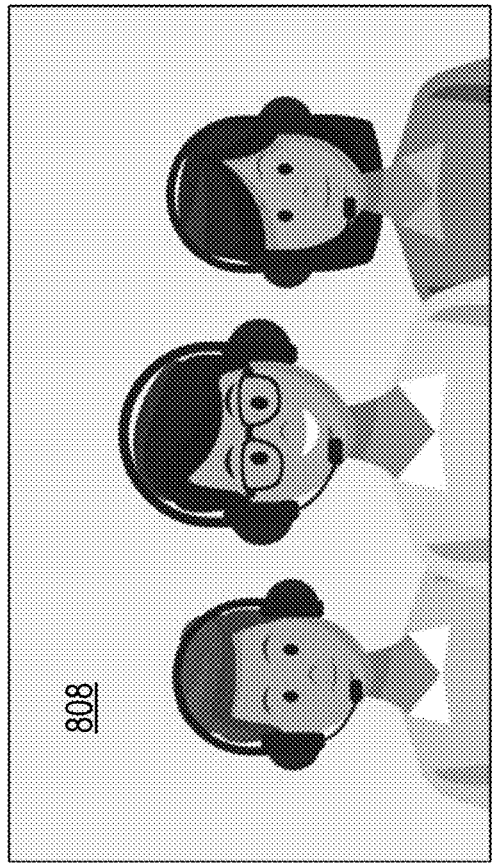
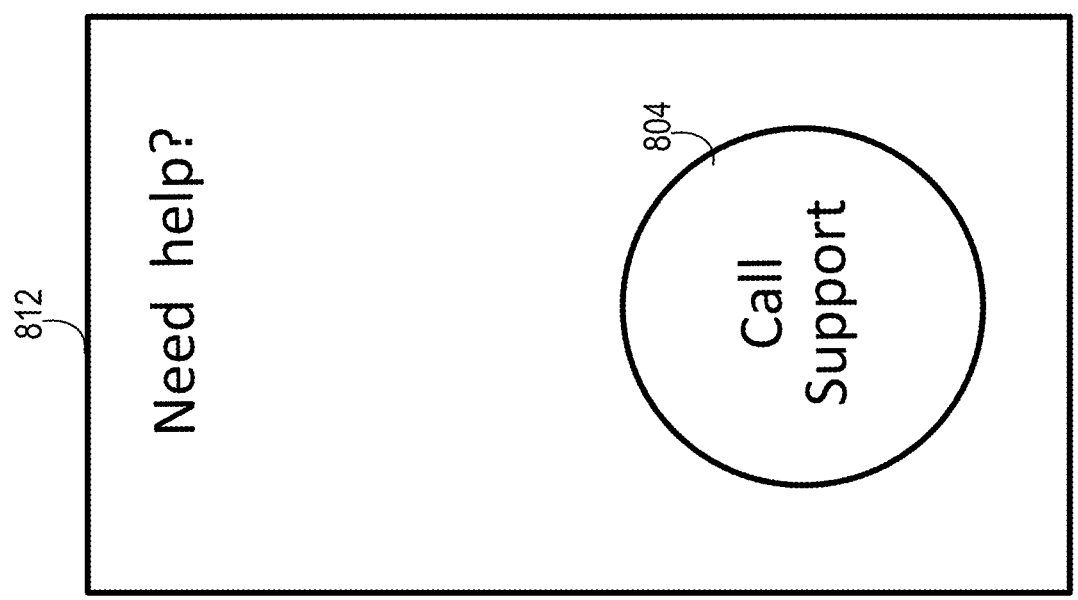
FIG. 8B
FIG. 8A

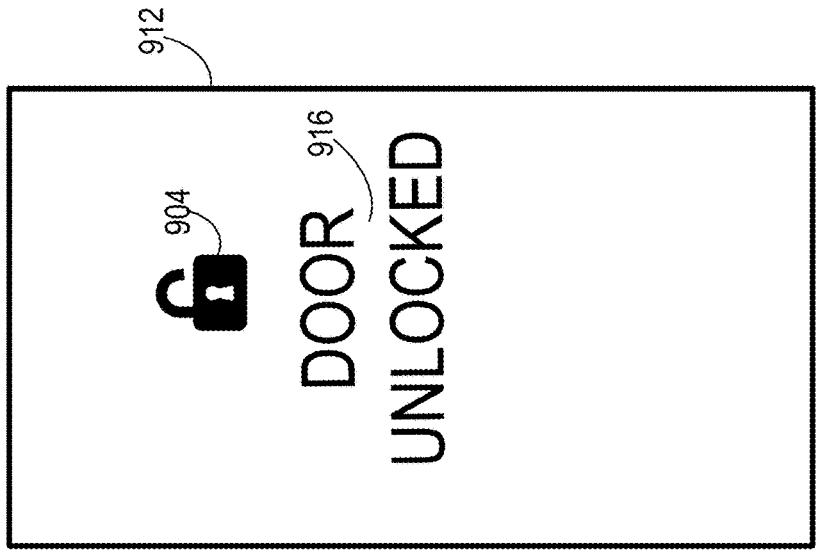
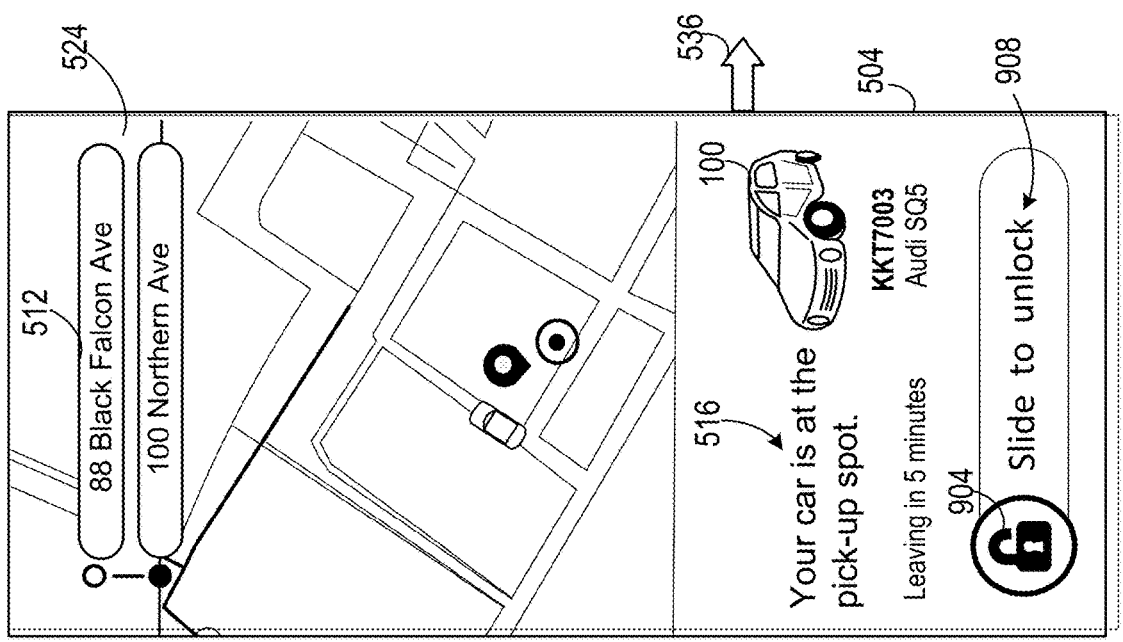
FIG. 9B
FIG. 9A

PASSENGER AUTHENTICATION AND ENTRY FOR AUTONOMOUS VEHICLES

FIELD OF THE INVENTION

This description relates generally to operation of vehicles and specifically to passenger authentication and entry for autonomous vehicles.

BACKGROUND

Ride-hailing for operation of a vehicle from an initial location to a final destination often requires a user to reliably and safely identify a vehicle to board in the presence of other users and vehicles. However, the proximity of other vehicles and users can pose challenges to confident, quick, and safe passenger authentication and entry.

SUMMARY

Methods, apparatus, and systems for passenger authentication and entry for autonomous vehicles are disclosed. In an embodiment, at least one processor of a vehicle receives information over a first communication channel from a first mobile device. The information specifies a time and a geographical location. The information causes the vehicle to arrive at the geographical location at the time. The at least one processor transmits a first message to a second mobile device indicating that the vehicle has arrived at the geographical location. The first message includes a graphical icon representing the vehicle. The graphical icon is for display on a user interface of the second mobile device. The at least one processor receives a second message from the second mobile device over a second communication channel. The second message indicates that the graphical icon was dragged across the user interface into a graphical receptacle displayed on the user interface. Responsive to receiving the second message, the at least one processor unlocks at least one door of the vehicle using a control circuit of the vehicle.

In an embodiment, the at least one processor receives a third message over the first communication channel from the first mobile device. The third message indicates that the first mobile device is located beyond a threshold distance of the geographical location. Responsive to receiving the third message, the at least one processor activates a personal identification number (PIN) pad of the vehicle to receive haptic input for unlocking the at least one door of the vehicle.

In an embodiment, the at least one processor converts the haptic input into an alphanumeric or digital code. The at least one processor determines that the alphanumeric or digital code is related to an identity of a user. The alphanumeric or digital code is for unlocking the at least one door of the vehicle.

In an embodiment, the at least one processor determines that the second mobile device is located within a threshold distance of the geographical location. Unlocking of the at least one door is performed responsive to determining that the second mobile device is located within the threshold distance of the geographical location.

In an embodiment, the at least one processor determines that a call button of the vehicle has been depressed. Responsive to determining that the call button of the vehicle has been depressed, the at least one processor initiates a teleoperation call to a teleoperation server.

In an embodiment, the second message includes biometric information generated by the second mobile device at the geographical location. The biometric information is related to an identity of a user.

In an embodiment, the at least one processor captures at least one image using a camera of the vehicle. The at least one processor determines that the at least one image is related to an identity of a user for unlocking the at least one door of the vehicle.

In an embodiment, the at least one processor analyzes an audio signal captured using at least one microphone of the vehicle. The at least one processor determines that the audio signal is related to an identity of a user for unlocking the at least one door of the vehicle.

In an embodiment, the at least one processor detects a signal from at least one sensor of the vehicle. The signal indicates that at least one seat in the vehicle is occupied. Unlocking the at least one door of the vehicle is performed responsive to detecting the signal from the at least one sensor.

In an embodiment, the first communication channel is a cellular communication channel and the second communication channel is at least one of a Bluetooth communication channel or a near field communication channel.

In an embodiment, the at least one processor receives haptic input from a fingerprint reader of the vehicle. The at least one processor determines that the haptic input is related to an identity of a user for unlocking the at least one door of the vehicle.

In an embodiment, a QR scanner of the vehicle scans a QR code displayed on the second mobile device. The at least one processor determines that the QR code is related to an identity of a user for unlocking the at least one door of the vehicle.

In an embodiment, the first mobile device is the second mobile device.

In an embodiment, the first communication channel is the same as the second communication channel.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 8A is an example of passenger authentication for an AV using a call button, in accordance with one or more embodiments.

FIG. 8B is an example of passenger authentication for an AV using teleoperation, in accordance with one or more embodiments.

FIG. 9A is an example of passenger authentication for an AV using a user interface of a mobile device, in accordance with one or more embodiments.

FIG. 9B is an example of passenger authentication for an AV using a display, in accordance with one or more embodiments.

DETAILED DESCRIPTION

Figure 1:
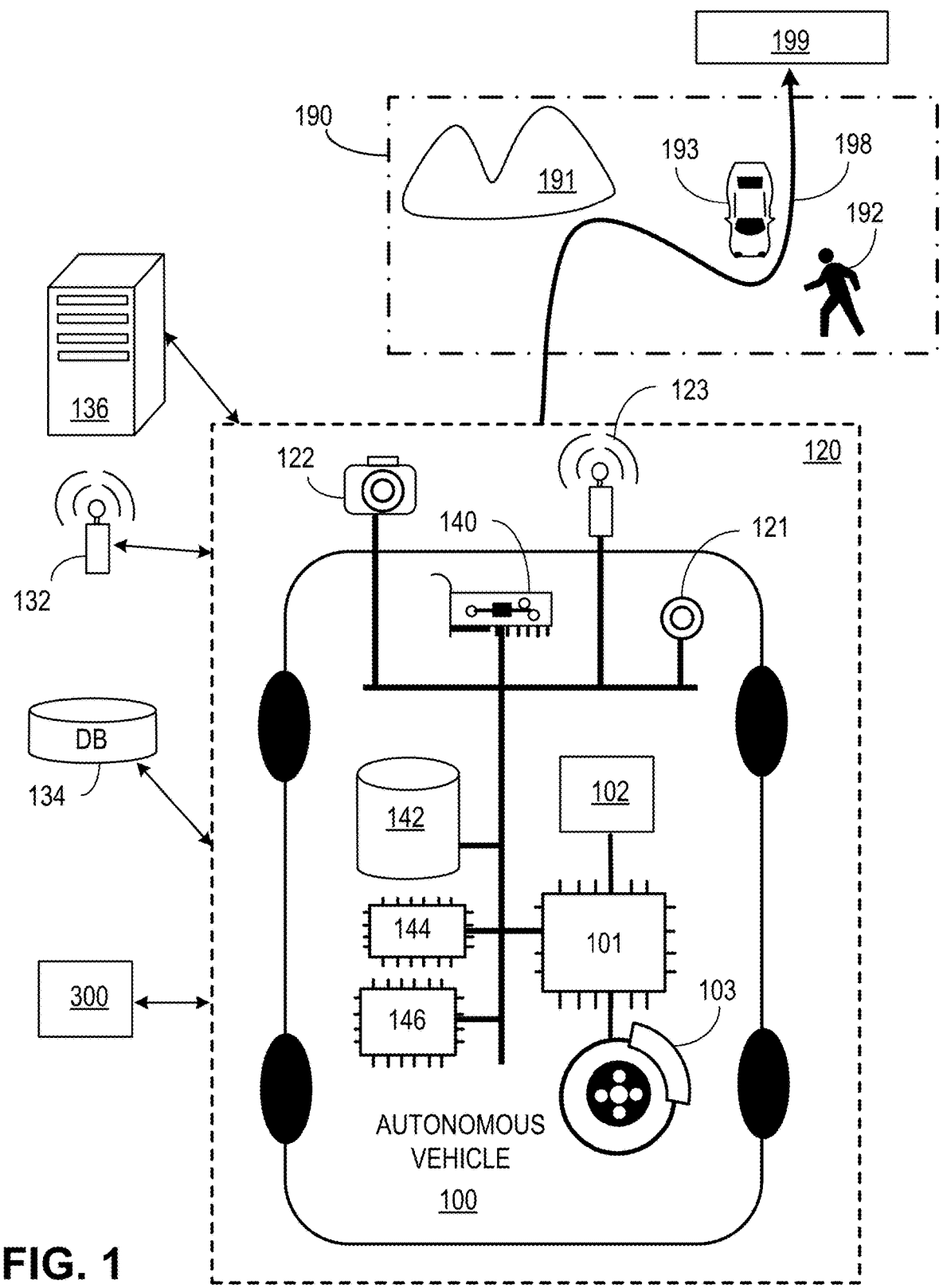
FIG. 1 is a block diagram illustrating an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in an embodiment.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Passenger Authentication and Entry for Autonomous Vehicles
5. Processes for Passenger Authentication and Entry for Autonomous Vehicles General Overview This document presents methods, systems, and apparatuses for passenger authentication and entry for AVs. After a user hails an AV to request an AV ride, the AV arrives at a particular geographical location at the requested time. Upon arriving, the AV transmits a message to a mobile device of the user indicating that the AV has arrived at the particular geographical location. The message is associated with a graphical icon that represents the particular AV, and is displayed on a user interface of the mobile device. To unlock a door of the AV, the user drags the graphical icon across the user interface of the mobile device and into a graphical receptacle, such as a basket, displayed on the user interface. The mobile device can also transmit information identifying the user, such as biometric information or a PIN, to the AV. When the AV determines that the intended user performed the drag-and-drop of the graphical icon, a control circuit of the AV unlocks the door of the AV for the ride to begin. If the mobile device malfunctions or is not available, the user can use a PIN pad of the AV to unlock the door, or use a call button on the AV to initiate a teleoperation call for assistance.

The advantages and benefits of the embodiments described include enabling a user to safely and reliably identify the AV they have hailed and unlock a door of the AV. If a passenger is not in possession of their mobile device, such as if another user has hailed the AV for the passenger, the passenger can operate a PIN pad on the AV to open the door. Each AV can be represented by a different graphical icon, enabling a passenger to identify which vehicle is the one they hailed more quickly than using other techniques (e.g., comparing vehicle plate numbers located in difficult to see locations when an AV approaches a passenger, etc.). The use of different communication channels for hailing the AV and unlocking the AV enables a user to hail the AV over a long-range communication channel (e.g., via a cellular connection or some other long-range connection) when the user is not in proximity to the AV and use a short-range communication channel (e.g., Bluetooth, etc.) to communicate with the AV when a passenger is in proximity to the AV, thus reducing the communication time between the user's device and the systems involved in unlocking the AV as well as the number of messages that need to be communicated between such devices.

System Overview

FIG. 1 is a block diagram illustrating an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a random-access memory (RAM) and/or a non-volatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the processor(s) 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are global navigation satellite system (GNSS), inertial measurement units (IMU) that measure both vehicle linear accelerations and angular rates, wheel sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with processor(s) 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in an embodiment, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Processor(s) 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to processor(s) 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
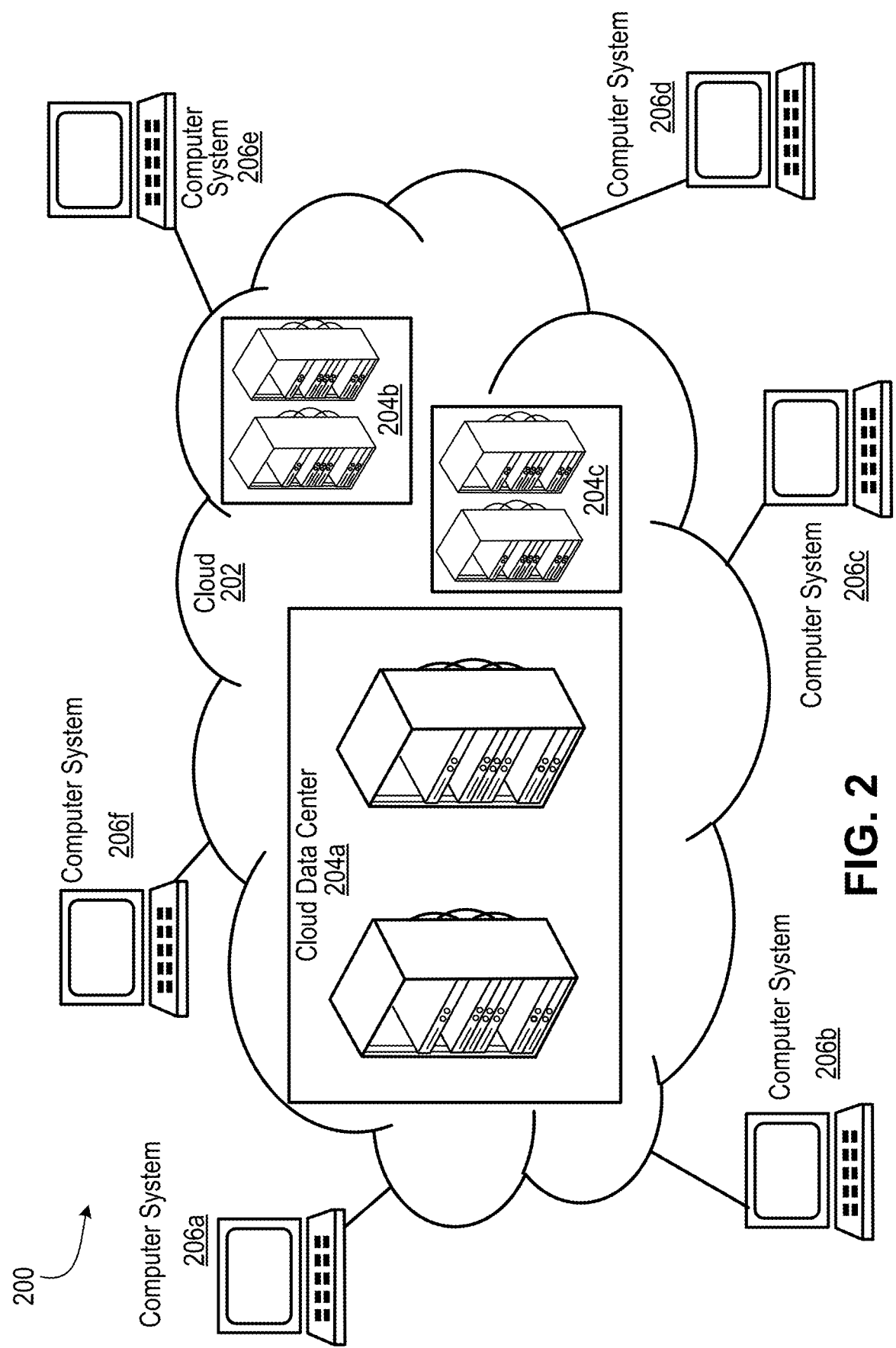
FIG. 2 is a block diagram illustrating an example "cloud" computing environment, in accordance with one or more embodiments.

FIG. 2 is a block diagram illustrating an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
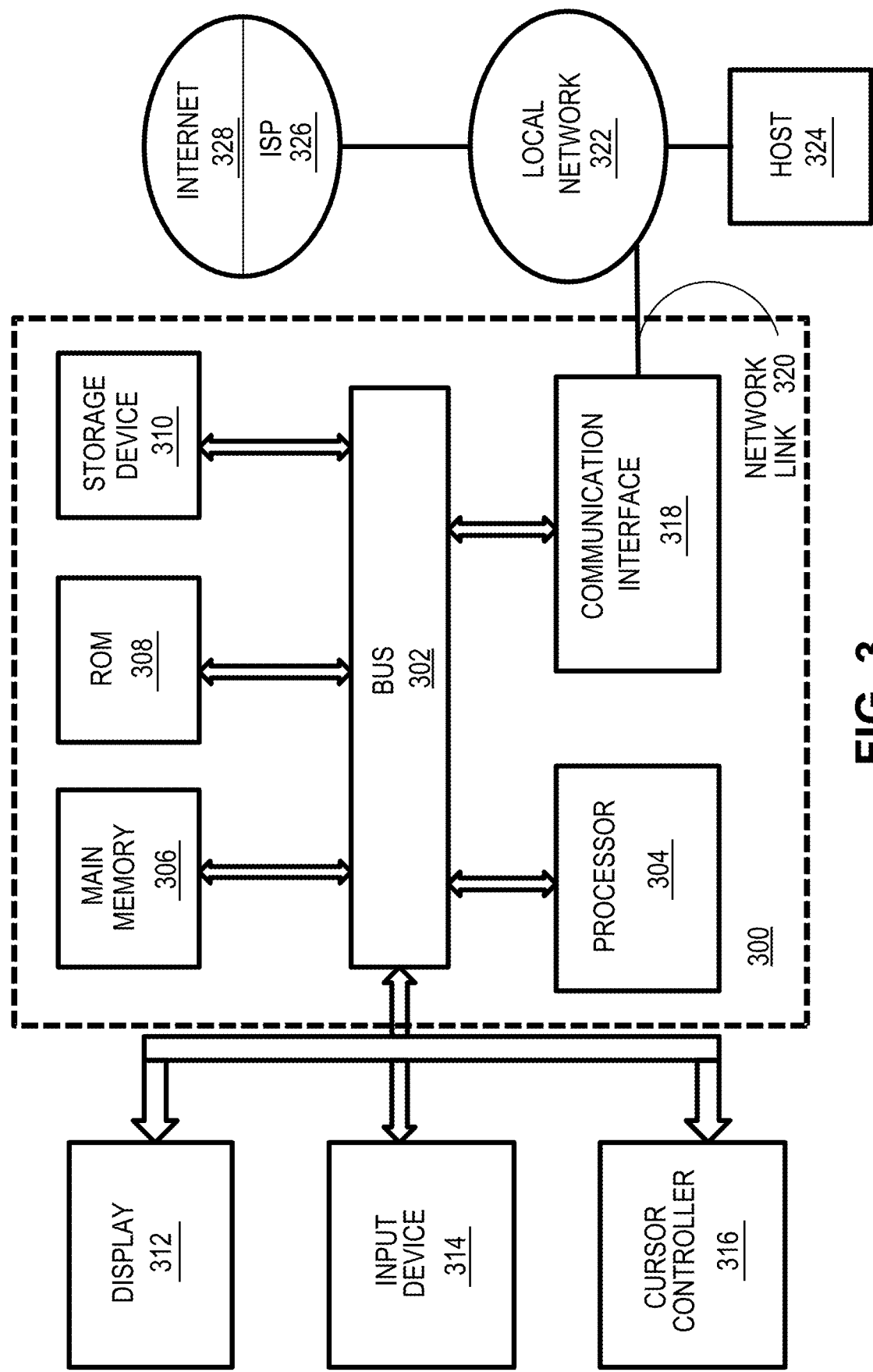
FIG. 3 is a block diagram illustrating a computer system, in accordance with one or more embodiments.

FIG. 3 is a block diagram illustrating a computer system 300. In an implementation, the computer system 300 is a special-purpose computing device. The special-purpose computing device is hard-wired to perform the techniques or includes digital electronic devices such as one or more ASICs or field programmable gate arrays (FPGAs) that are persistently programmed to perform the techniques or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a RAM or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
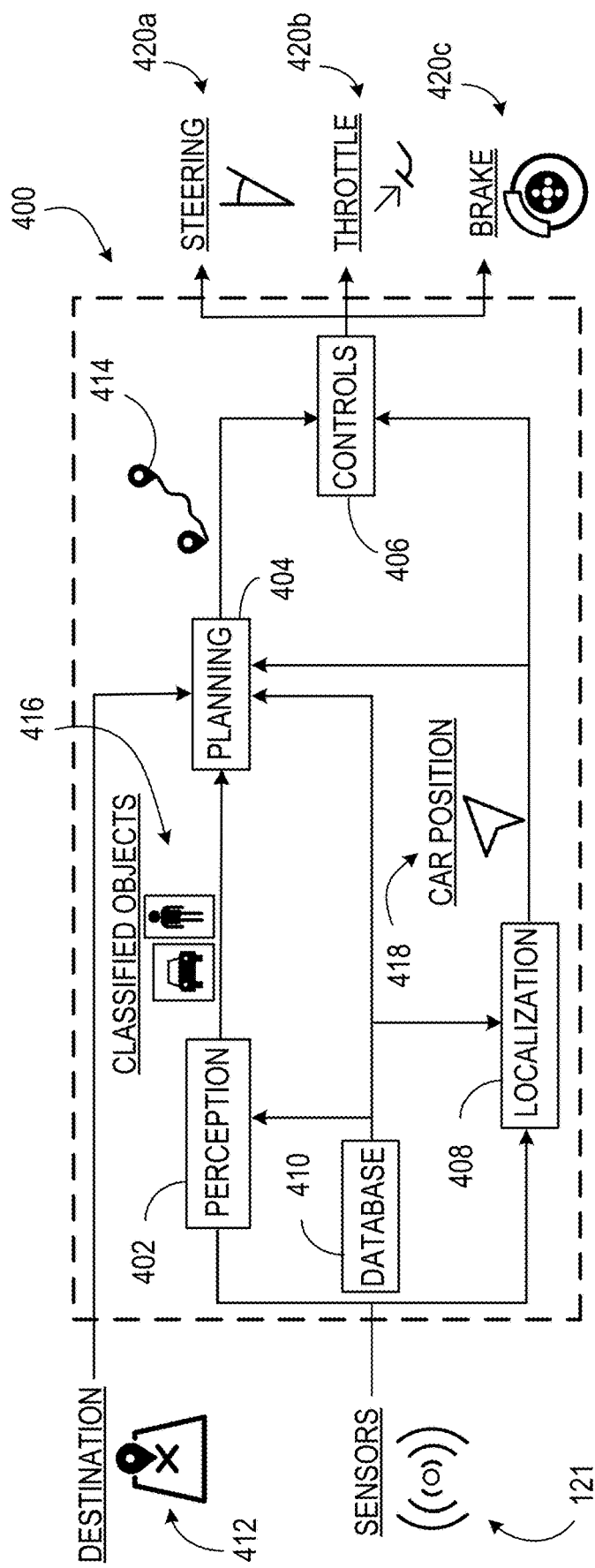
FIG. 4 is a block diagram illustrating an example architecture for an AV, in accordance with one or more embodiments.

FIG. 4 is a block diagram illustrating an example architecture 400 for an AV (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographical data) to calculate a position. For example, the localization module 408 uses data from a GNSS unit and geographical data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Passenger Authentication and Entry for Autonomous Vehicles

Figure 5:
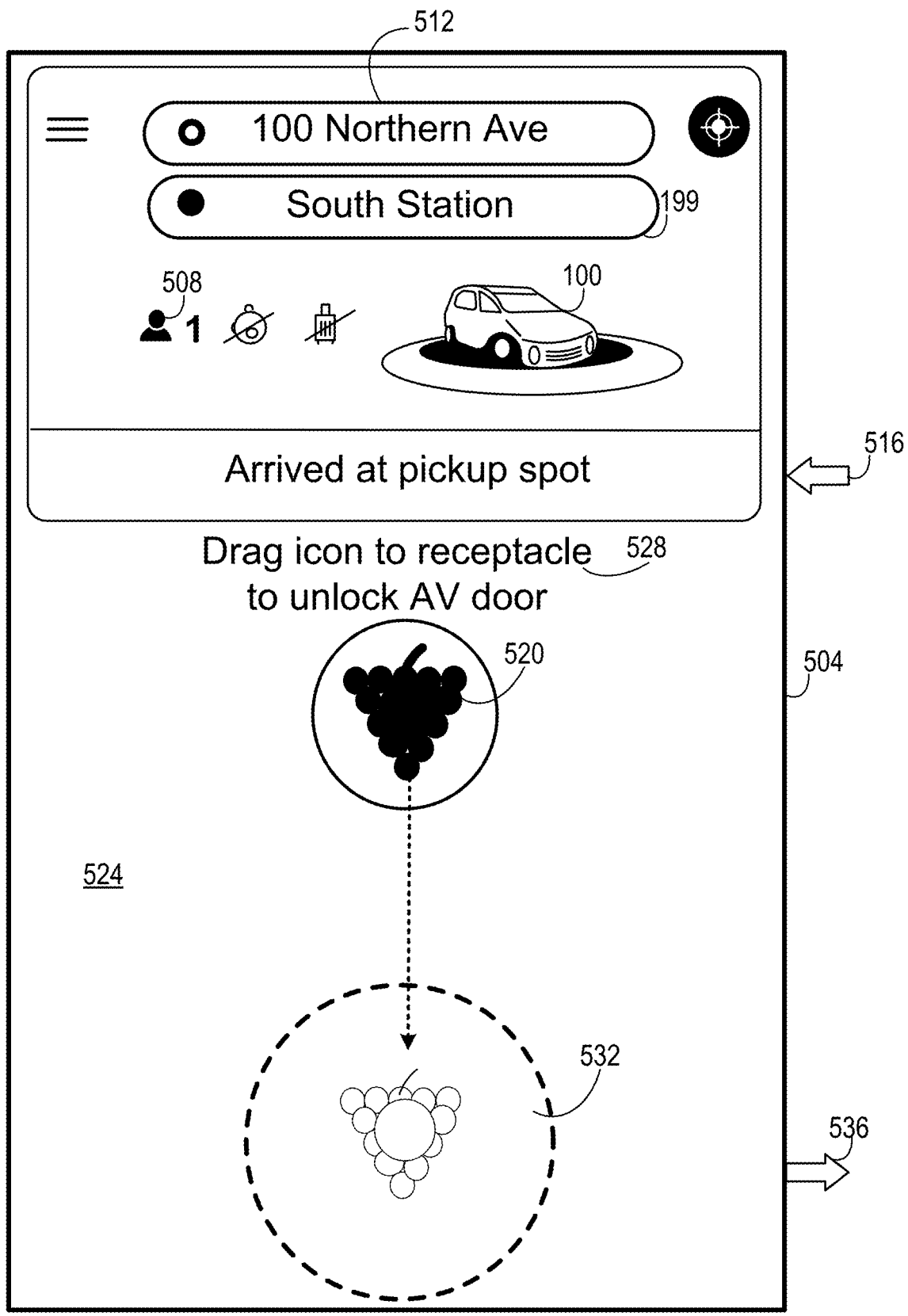
FIG. 5 is an example illustration of passenger authentication for an AV using a user interface of a mobile device, in accordance with one or more embodiments.

FIG. 5 is a block diagram illustrating an example of passenger authentication for an AV 100 using a user interface 524 of a mobile device 504. The AV 100 is illustrated and described in more detail with reference to FIG. 1. Once a user requests an AV ride, the AV 100 arrives at a requested location at a requested time. Upon arriving, the AV 100 sends a message to a mobile device of the user, indicating that the AV 100 has arrived. A graphical icon representing the AV 100 is displayed on the mobile device. To unlock the AV 100, the user drags the graphical icon across the screen of the mobile device. If the mobile device malfunctions or is not available, the user can use a PIN pad of the AV 100 to unlock the door, or use a call button on the AV 100 to initiate a teleoperation call for assistance.

In an embodiment, at least one processor of the AV 100 receives information over a communication channel from a mobile device 504. The processor is the same as or similar to the processor 146 illustrated and described in more detail with reference to FIG. 1. In an embodiment, the processor is part of a perception module, planning module, or control module of the AV 100. The perception module is the same as or similar to the perception module 402 illustrated and described in more detail with reference to FIG. 4. The planning module is same as or similar to the planning module 404 illustrated and described in more detail with reference to FIG. 4. The control module is same as or similar to the control module 406 illustrated and described in more detail with reference to FIG. 4. The communication channel is same as or similar to the communication channel 604 illustrated and described in more detail with reference to FIG. 6A.

In an embodiment, the mobile device 504 is a smartphone, a tablet, a smartwatch, a personal digital assistant (PDA), or a wearable fitness tracker having a touchscreen. The mobile device 504 is implemented using a computer system, for example the computer system 300 illustrated and described in more detail with reference to FIG. 3. A user 508 of the mobile device 504 or a ride-hailing service enters a request on the mobile device 504 for an AV ride. The mobile device 504 sends information over the communication channel to the AV 100, specifying a particular time and a particular geographical location 512 for picking up the user 508 or a different passenger, for example, the passenger 628 illustrated in FIG. 6C. In an embodiment, the information specifies a destination, a number of passengers, or whether the user has luggage. In another example, destination 199 is illustrated and described in more detail with reference to FIG. 1. In an embodiment, the information further specifies an identity of the user 508 or an identity of a passenger, for example, the passenger 628 illustrated in FIG. 6C, who will in fact be riding in the AV 100 (if the user 508 is not the passenger). The information causes the AV 100 to arrive at the geographical location 512 at the particular time to begin the ride. For example, the AV 100 uses the path planning methods illustrated and described in more detail with reference to FIG. 10 to arrive at the geographical location 512 at the requested time.

The processor of the AV 100 transmits a message 516 to the mobile device 504 indicating that the AV 100 has arrived at the geographical location 512. The message 516 optionally indicates a time at which the AV 100 actually arrived, a make (e.g., indicating a manufacturer) of the AV 100, a model of the AV 100, a color of the AV 100, or a particular location where the AV 100 is idling or parked, e.g., "next to a curb," "beside a particular building," or "at a designated ride-hailing pickup spot." The message 516 is sent to the mobile device 504 over a communication channel, for example, the communication channel 608.

The message 516 includes or is associated with a graphical icon 520 representing the AV 100. The graphical icon 520 is for display on a user interface 524 of the mobile device 504. For example, the mobile device 504 receives the graphical icon 520 within the message 516 and displays the graphical icon 520 on the user interface 524 of the mobile device 504. In an embodiment, the AV 100 transmits the graphical icon 520 within the message 516 to the mobile device 504. In another embodiment, the AV 100 transmits data (graphics data, data related to an index or table that is usable by a mobile device 504 to identify the appropriate graphical icon 520, alphanumeric data, or some other type of data) to the mobile device 504 that the mobile device 504 uses to generate the graphical icon 520 on the user interface 524 of the mobile device 504. A purpose of the graphical icon 520 is to identify the AV 100, the user 508, a passenger, or the particular ride. Each different AV is represented by a different graphical icon. In an embodiment, the graphical icon 520 indicates a make, model, or color of the AV 100, a name of the user 508 or passenger, a name of an entity owning, leasing, or operating the AV 100, a name of a vehicle dispatch service, the mobile device 504, or a combination thereof.

In an embodiment, the mobile device 504 displays instructions 528 on the user interface 524 prompting the user 508 to drag the graphical icon 520 across the user interface 524 and into a graphical receptacle 532 to unlock at least one door of the AV 100. For example, the graphical receptacle 532 displayed on the user interface 524 is a basket, a target icon, or another type of reconfigurable icon. The user 508 drags the graphical icon 520 across the user interface 524 and into the graphical receptacle 532 to securely unlock at least one door of the AV 100. The processor of the AV 100 receives a message 536 from the mobile device 504 indicating that the graphical icon 520 was dragged across the user interface 524 into the graphical receptacle 532 displayed on the user interface 524. In response to receiving the message 536, the processor unlocks at least one door of the AV 100 using a control circuit of the AV 100.

Figure 6B:
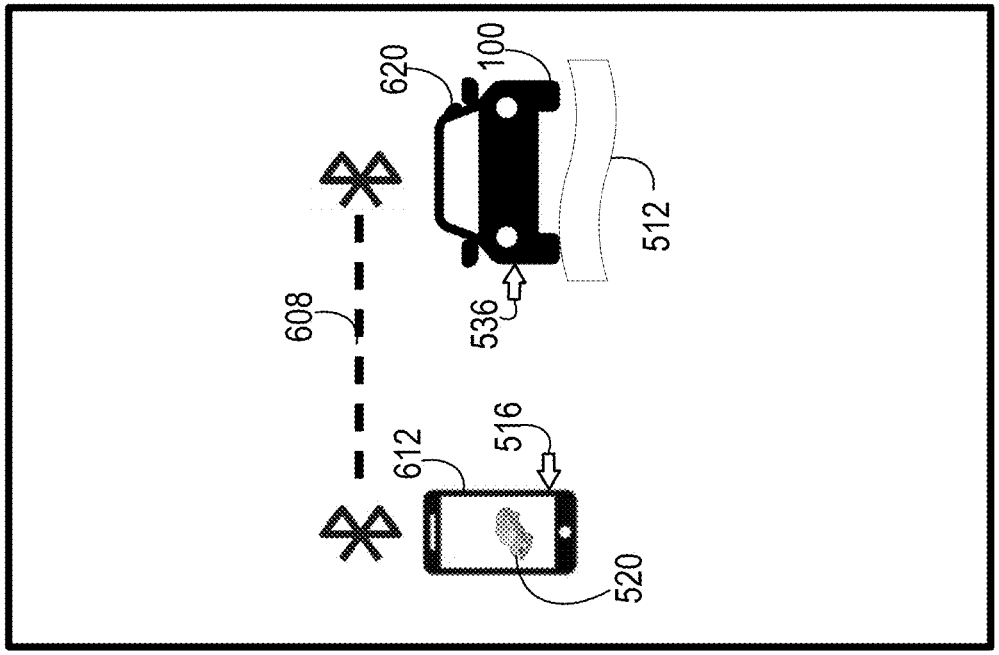
FIG. 6B is an alternative example illustration of passenger authentication and entry for an AV, in accordance with one or more embodiments.
Figure 6A:
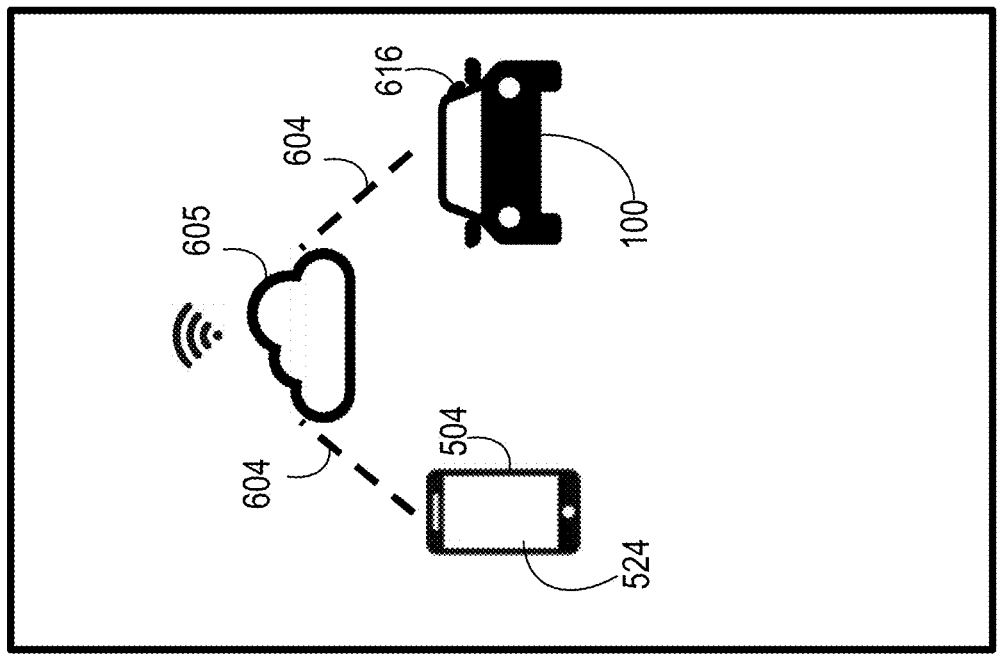
FIG. 6A is an example illustration of passenger authentication and entry for an AV, in accordance with one or more embodiments.

FIG. 6A is an example illustration of passenger authentication and entry for an AV 100, in accordance with various embodiments. The AV 100 is illustrated and described in more detail with reference to FIG. 1. FIG. 6B is an alternative example illustration of passenger authentication and entry for an AV 100. The AV 100 receives information over a communication channel 604 from a mobile device 504. The mobile device 504 is illustrated and described in more detail with reference to FIG. 5. The information specifies a time and a geographical location, for example the geographical location 512 illustrated and described in more detail with reference to FIGS. 5, 6B.

The communication channel 604 is sometimes referred to as a "first communication channel." In an embodiment (not shown), the communication channel 604 is a short-range wireless communication channel used when the mobile device 504 is in proximity to the AV 100. Specifically, as used herein, a "short-range wireless communication channel" is a communication channel or pathway by which the mobile device 504 is able to communicate directly with the AV 100. Examples of such a short-range wireless communication channel include near field communication (NFC), Bluetooth, Wi-Fi, infrared, ultraband, Wi-SUN, or Zigbee.

In another embodiment, and as shown in FIG. 6A, the communication channel 604 is a long-range wireless communication channel that is configured for use when the mobile device 504 is not within proximity of the AV 100. The long-range wireless communication channel can include at least one intervening device within the communications pathway between the mobile device 504 and the AV 100 such as at least one router or access node. Examples of such a long-range wireless communication channel include a cellular connection, long-range Wi-Fi, long-term evolution (LTE), radio waves, mobile broadband, or the fifth generation technology standard for broadband cellular networks (5G). In an embodiment, the communication channel 604, whether configured as a long-range wireless communication channel or a short-range wireless communication channel, can include a virtual private network (VPN) that only the mobile device 504 and the AV 100 can access, e.g., when the mobile device 504 is in a particular mode of operation.

Figure 6D:
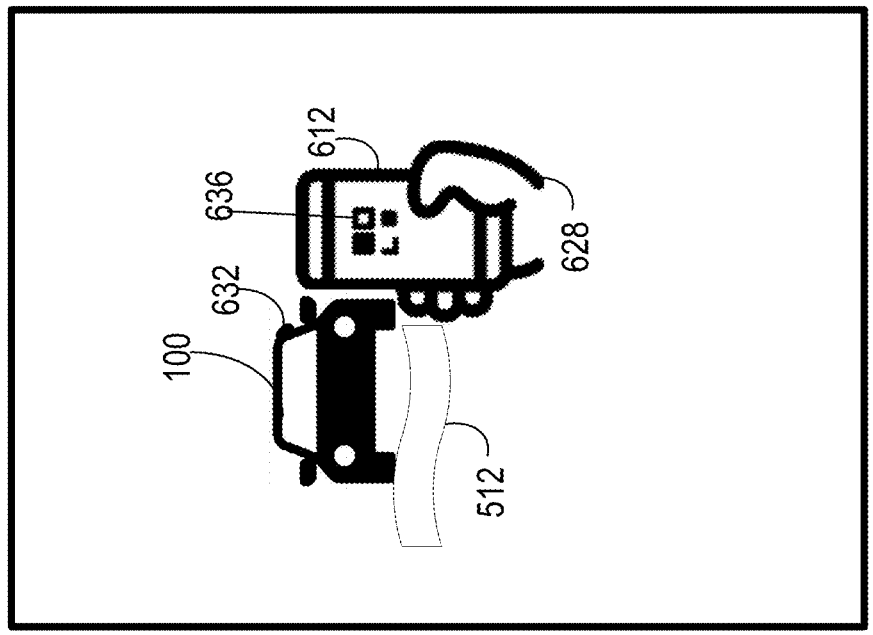
FIG. 6D is an alternative example illustration of passenger authentication and entry for an AV, in accordance with one or more embodiments.
Figure 6C:
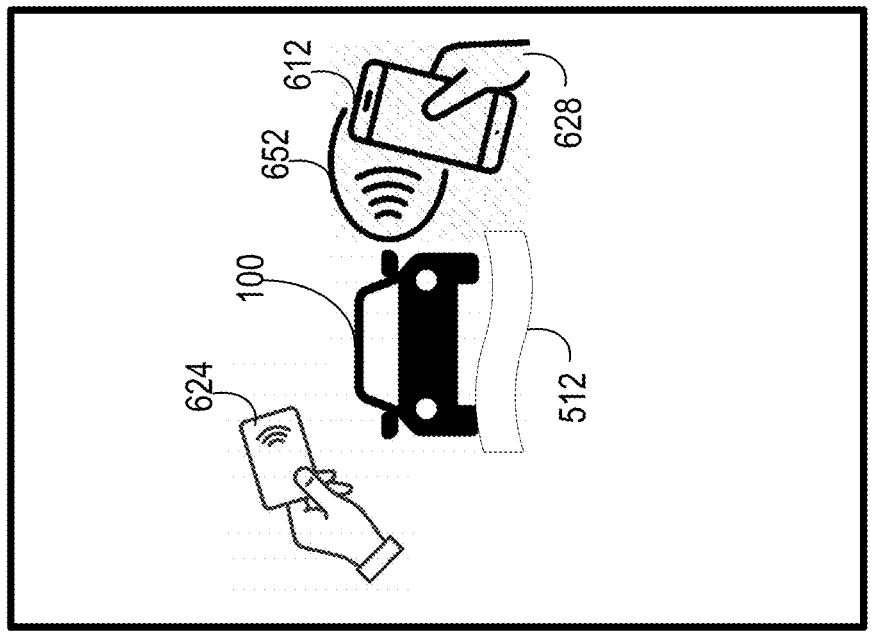
FIG. 6C is an alternative example illustration of passenger authentication and entry for an AV, in accordance with one or more embodiments.

In an embodiment, and as shown in FIG. 6A, the mobile device 504 transmits, via communication channel 604, a request for a ride for a passenger (other than the user of the mobile device 504), for example, the passenger 628 illustrated in FIG. 6C. As depicted in FIG. 6A, the communication channel 604 is a long-range wireless communication channel. The passenger can have their own mobile device 612 shown in FIG. 6B. The mobile device 612 can be a smartphone, a tablet, a smartwatch, a PDA, or a wearable fitness tracker having a touchscreen. The mobile device 612 is implemented using a computer system, for example, the computer system 300 illustrated and described in more detail with reference to FIG. 3. In an embodiment where the user of the mobile device 504 is the passenger, the mobile device 504 is the same as the mobile device 612.

As one example of the communication path 604, the information is sent from a user's smartphone (for example, the mobile device 504) to a server 605, and then sent from the server 605 to the AV 100. Server 605 is similar to, for example, example server 136 as illustrated and described in more detail with reference to FIG. 1. The server 605 can be an application-specific server, for example a server that is part of the same service network of which AV 100 is a part. In another embodiment, the server 605 can be a general server that is used, for example, for Internet communication. Although only a single server 605 is illustrated in communication pathway 604, it will be understood that real world embodiments can include a plurality of different servers.

A processor of the AV 100, for example, the processor 146, illustrated and described in more detail with reference to FIG. 1, transmits a message 516 (shown in FIG. 5) to one or both of the mobile devices 504, 612 indicating that the AV 100 has arrived at the geographical location 512. The message 516 includes a graphical icon 520 representing the AV 100. The graphical icon 520 is for display on a user interface of one or both of the mobile devices 504, 612.

The AV 100 receives a message 536 from one or both of the mobile devices 504, 612 over the communication channel 608. As shown in FIG. 6B, the communication channel 608 is a short-range wireless communication channel such as the short-range wireless communication channels described above. More specifically, communication channel 608 is depicted as a Bluetooth communication channel. As shown in FIGS. 6A and 6B, the communication channel 608 is different from the communication channel 604. It will be understood, however, that in other embodiments the communication channels 604 and 608 can both be a long-range wireless communication channel, a short-range wireless communication channel, or the same type of long-range or short-range wireless communication channel (e.g., both a cellular communication channel, Wi-Fi, Bluetooth, etc.) In one embodiment, when a user of the mobile device 504 is not located at the geographical location 512 but is hailing a ride for another passenger (for example, the passenger 628 illustrated in FIG. 6C), the communication channel 604 can be or include a first VPN and the communication channel 608 can be or include a second VPN (for use by the mobile device 612) that is different from the first VPN.

It will be understood that certain of the communication channels can include the use of multiple types of communications protocols. For example, a long-range communication channel such as communication channel 604 can include use of both Wi-Fi and cellular connections. Other combinations of different communications channels can similarly be used for one or both of communications channels 604 or 608.

A purpose of having different communication channels is to enable a user of the mobile device 504 to hail the AV 100 over the communication channel 604 (e.g., the long-range wireless communication channel) when the user is not in proximity to the AV 100. The communication channel 608 (e.g., the short-range wireless communication channel) is then used when the user or another passenger (for example, the passenger 628 illustrated in FIG. 6C) is in proximity to the AV 100. In this way, use of the short-range wireless communication channel (e.g., communication channel 608) can shorten the communication time necessary for the mobile device 612 to interact with the AV 100 when the mobile device 612 and AV 100 are proximate to one another (e.g., as opposed to using a long-range communication channel). When a user of the mobile device 504 is not a passenger, a passenger uses the mobile device 612 to interact with the AV 100 once the AV 100 arrives at the geographical location 512. For example, the message 536 is sent from the mobile device 612 to the AV 100 directly via communication channel 608 (i.e., the short-range wireless communication channel).

The message 536 indicates that the graphical icon 520 was dragged across a user interface (e.g., the user interface 524 shown in FIG. 6A) into a graphical receptacle displayed on the user interface, for example, the graphical receptacle 532 illustrated and described in more detail with reference to FIG. 5. In response to receiving the message 536, a processor of the AV 100 unlocks at least one door of the AV 100. In an embodiment, the AV 100 determines that one or both of the mobile devices 504, 612 is located within a threshold distance of the geographical location 512. Unlocking the door is performed responsive to determining that one or both of the mobile devices is located within the threshold distance of the geographical location 512. The threshold distance can be, for example, 3 feet, 2 yards, 5 yards, etc. The purpose of the distance threshold is to unlock the door only when the intended passenger, for example, the passenger 628 illustrated in FIG. 6C, is at or near the AV 100 for security and to ensure a passenger enters the AV 100 and not another vehicle that may be similar to AV 100 at the geographical location 512.

In an embodiment, the message 536 includes biometric information generated by one or both of the mobile devices 504, 612 at the geographical location 512. For example, the mobile device 612 (shown in FIG. 6B) captures a fingerprint, an image, a video clip, an audio clip, or a combination thereof of a passenger, for example, the passenger 628 illustrated in FIG. 6C. The biometric information generated by the mobile device 612 is embedded into the message 536 to identify or authorize the passenger. The biometric information is related to an identity of a user of one or both of the mobile devices 504, 612. For example, the biometric information corresponds to a user of the mobile device 612, a friend of a user of the mobile device 504 (e.g., a passenger), or a combination thereof. The biometric information increases security of the passenger authentication process, such that only when the biometric information generated by the mobile device at the geographical location 512 matches expected results by the processor, the doors are unlocked.

In an embodiment, the processor of the AV 100 captures at least one image using a camera 616 of the AV 100, as illustrated in FIG. 6A. Example cameras are illustrated and described in more detail with reference to FIGS. 1, 5, 7. The AV 100 determines that the image is related to an identity of a user of either of the mobile devices 504, 612 for unlocking the door of the AV 100. Example methods for object recognition are described in more detail with reference to FIG. 4. For example, the image can be an image of a passenger (e.g., a friend of a user of the mobile device 612), a driver's license or other identification document of a passenger, for example, the passenger 628 illustrated in FIG. 6C, and/or the like. In an embodiment, matching the image against the identity of a user of either of the mobile devices 504, 612 includes extracting a feature vector from the image.

In an embodiment, as described above, the communication channel 604 is the same as the communication channel 608. For example, both communication channels 604 and 608 are a long-range wireless communication channel, a short-range wireless communication channel, or the same type of long-range or short-range wireless communication channel (e.g., both a cellular communication channel, a Wi-Fi communication channel, etc.). In an additional embodiment, one or both of the mobile devices 504, 612 can establish a mobile hotspot and the AV 100 can connect to the mobile hotspot by Wi-Fi to transmit and receive the messages. In such an embodiment, the communication channel 608 is Wi-Fi or the mobile hotspot.

In an embodiment, security is increased for authentication of a passenger, for example, the passenger 628 illustrated in FIG. 6C, by analyzing an audio signal captured using at least one microphone 620 (shown in FIG. 6B). The AV 100 determines that the audio signal is related to an identity of a user of either of the mobile devices 504, 612 for unlocking a door of the AV 100. For example, one or both of the mobile devices 504, 612 prompts a passenger to utter a passphrase or words, and a processor of the AV 100 performs speech recognition to decode the audio signals and match the audio signals to stored information. In an embodiment, the AV 100 extracts features from the audio signals and matches the features to stored features based on speech of a user of either of the mobile devices 504, 612.

FIG. 6C is an alternative example illustration of passenger authentication and entry for an AV 100. The AV 100 is illustrated and described in more detail with reference to FIG. 1. In an embodiment, the AV 100 uses a short-range wireless communication channel such as NFC to communicate with the mobile device 612.

In an embodiment, when the AV 100 has cellular connectivity or some other type of connectivity, the mobile device 612 exchanges data with online services. An NFC-based communication channel 652 (i.e., a short-range wireless communication channel that uses NFC) is used for contactless communication of messages such as messages 516 and 536 over short distances between the mobile device 612 or an NFC device 624 (e.g., a card or smart document) and the AV 100. For example, the mobile device 612 or NFC device 624 and the AV 100 connect via a point-to-point contact over a short distance (e.g., 2-4 cm) at the geographical location 512.

In an embodiment, the communication channel 652 is used to exchange data between the mobile device 612 or the NFC device 624 and the AV 100. For example, the mobile device 612 or NFC device 624 is provided with software, for example, to read electronic tags or make payments when connected to the NFC-compliant AV 100. NFC enables devices configured to communicate using NFC communication channels, such as the mobile device 612, to act like a smart card and allow a passenger 628 to perform transactions such as payment transactions or ticketing transactions. Second, the mobile device 612 or NFC device 624 can read information stored on an NFC tag included (e.g., embedded and/or the like) on the AV 100.

FIG. 6D is an alternative example illustration of passenger authentication and entry for an AV 100. The AV 100 is illustrated and described in more detail with reference to FIG. 1. The mobile device 612 is illustrated and described in more detail with reference to FIG. 6B. In an embodiment, a QR scanner 632 of the AV 100 scans a QR code 636 displayed on the mobile device 612. A processor, for example, the processor 146 illustrated in FIG. 1 determines that the QR code 636 is related to an identity of a user or a passenger for unlocking a door of the AV 100. A purpose of the QR code 636 is to increase security for passenger authentication when determining whether or not to unlock the door of AV 100. For example, the QR code 636 includes information about the particular time of the trip, a destination, the geographical location 512, a friend of a user of the mobile device 612, the passenger 628, the AV 100, or a combination thereof. The geographical location 512 is illustrated and described in more detail with reference to FIG. 6B. In an embodiment, the geographical location 512 is represented by GPS coordinates, a street address, a name of a particular establishment, restaurant, business, school, ride-hailing pickup point, or a combination thereof.

Figure 6E:
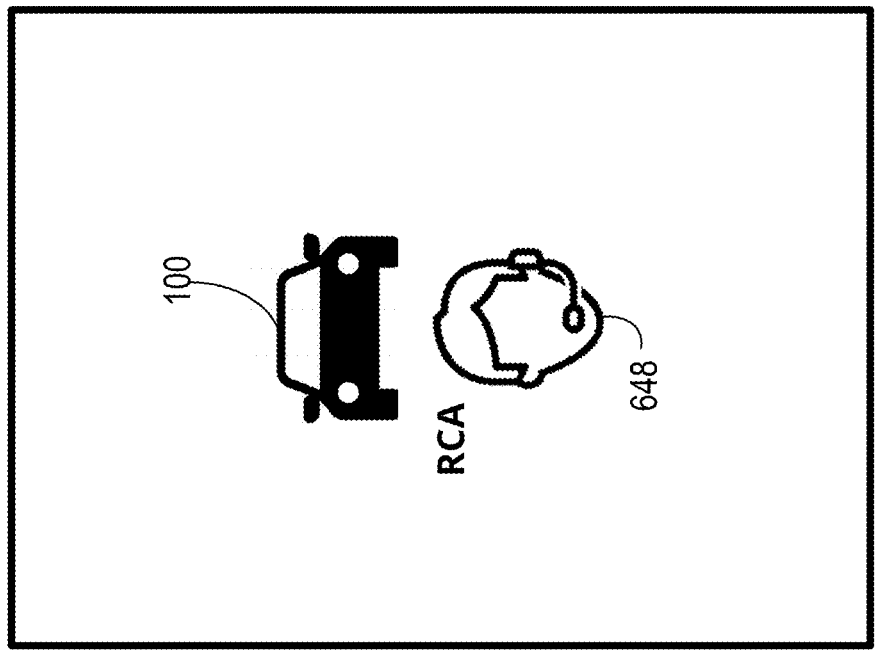
FIG. 6E is an alternative example illustration of passenger authentication and entry for an AV, in accordance with one or more embodiments.

FIG. 6E is an alternative example illustration of passenger authentication and entry for an AV 100. The AV 100 is illustrated and described in more detail with reference to FIG. 1. In an embodiment, the AV 100 receives a message 644 over a communication channel from a mobile device, for example, the mobile device 504 illustrated and described in more detail with reference to FIG. 5. The communication channel used is the same as or similar to the communication channels 604, 608 illustrated and described in more detail with reference to FIGS. 6A-B. For example, the communication channel is a VPN for use by the mobile device and the AV 100.

The message includes an indication that the mobile device is located beyond a threshold distance of a geographical location, for example, at an address associated with the geographical location 512 illustrated and described in more detail with reference to FIG. 5. In an embodiment, the threshold distance is 10 feet, 50 feet, 100 feet, etc., and is typically large enough to indicate at least one of: (1) a user of the mobile device will not enter the AV 100 at the geographical location, (2) a user of the mobile device will ride in the AV 100 from the geographical location but the user does not have the mobile device in their possession, (3) a passenger 628 will ride in the AV 100 from the geographical location but the passenger 628 does not have a mobile device in their possession, (4) a passenger 628 does not wish to use their mobile device, or (5) a mobile device is dead or unable to perform the unlocking function.

In an embodiment, a user of the mobile device is not a passenger 628. If the passenger 628 does not in fact have a mobile device, the message 644 indicates that the passenger 628 waiting at the geographical location is not in possession of a mobile device. The message 644 optionally further indicates that the passenger 628 or a user of the mobile device prefers that the passenger 628 use the PIN pad 640 to unlock the doors. In an embodiment, the PIN pad 640 is attached to or embedded in the AV 100.

In response to receiving the message 644 located at a distance that is greater than the threshold distance, a processor of the AV 100 (for example, processor 146 illustrated in FIG. 1) activates the PIN pad 640 to receive haptic input from the passenger 628 for unlocking a door of the AV 100. The haptic input is translated into a PIN, or alphanumeric or digital code, for example, the PIN 704, illustrated and described in more detail with reference to FIG. 7B. The PIN pad 640 is a PIN entry device (PED), such as an electronic device used to accept and optionally encrypt a user's PIN or AV entry code. In an embodiment, the PIN pad 640 is mounted to or embedded in the AV 100 and activated when needed. In an embodiment, the PIN pad 640 reads a card swiped by a user or the passenger 628, allows a PIN, or alphanumeric or digital code to be securely entered, and unlocks the door of the AV 100.

In an embodiment, a processor of the AV 100 converts the haptic input into an alphanumeric or digital code. The AV 100 determines that the alphanumeric or digital code is related to an identity of a user, the passenger 628, or both for unlocking a door of the AV 100. For example, the alphanumeric or digital code is a hash function output of an identity of a user or the passenger 628, a particular time of the trip, a geographical location, an indication of the AV 100, etc. The alphanumeric or digital code can also be sent in a message (for example, the message 516 illustrated in FIG. 5) from the AV 100 to a mobile device for the passenger 628 to enter into the PIN pad 640. In an alternative embodiment, the PIN pad 640 is a graphical PIN pad (similar to a smartphone screen keypad) that a mobile device generates on a user interface of the mobile device. An example mobile device 504 and example user interface 524 are illustrated and described in more detail with reference to FIG. 5.

Figure 6F:
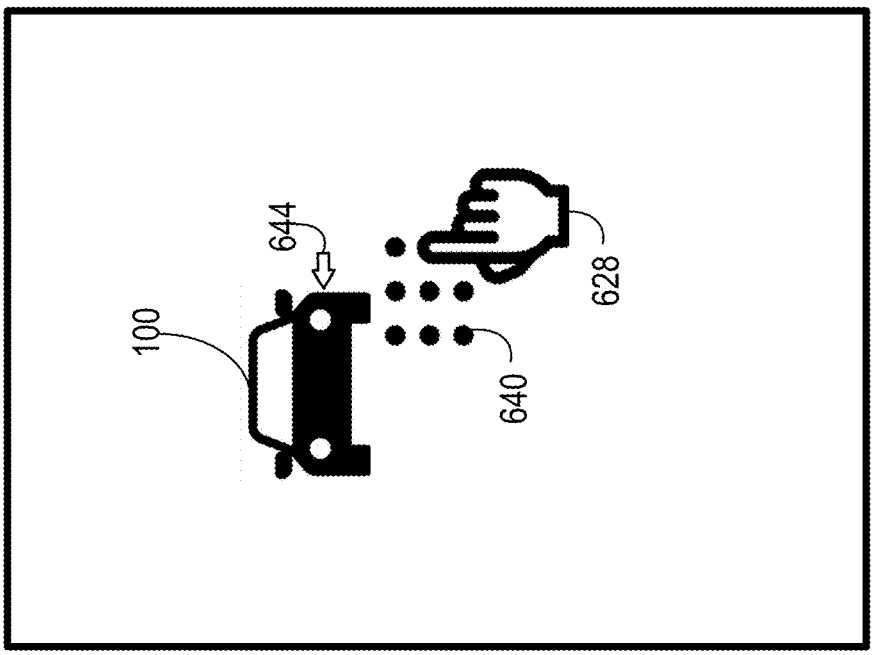
FIG. 6F is an alternative example illustration of passenger authentication and entry for an AV, in accordance with one or more embodiments.
Figure 7B:
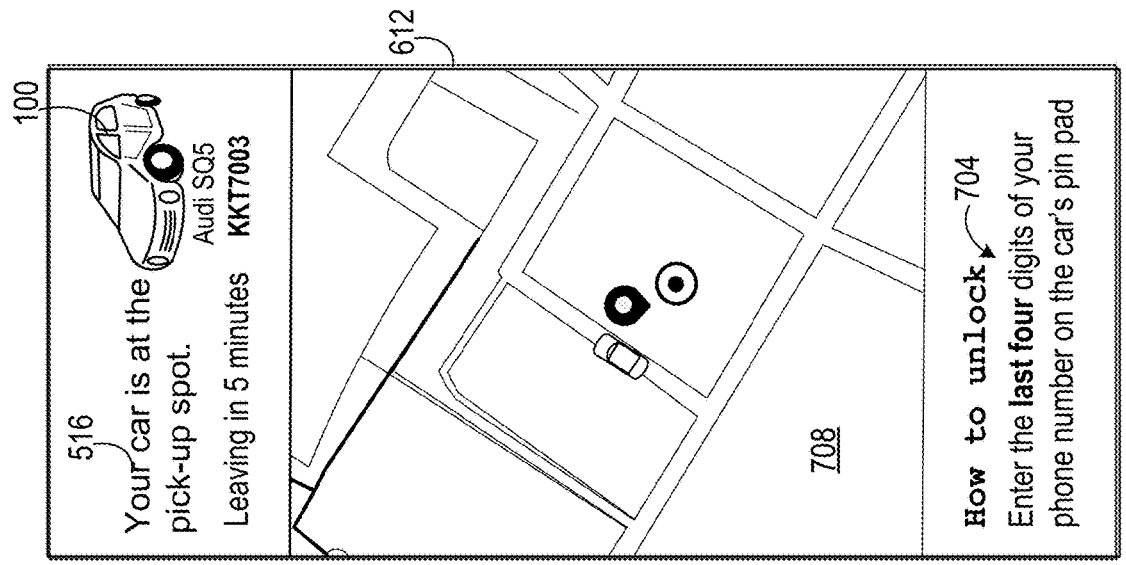
FIG. 7B is an example of a user interface of a mobile device, in accordance with one or more embodiments.

FIG. 6F is an alternative example illustration of passenger authentication and entry for an AV 100. The AV 100 is illustrated and described in more detail with reference to FIG. 1. A processor of the AV 100 determines that a call button has been depressed. The processor is the same as or similar to the processor 146 illustrated and described in more detail with reference to FIG. 1. Example call buttons 724, 804 are illustrated and described in more detail with reference to FIGS. 7D, 8A. In an embodiment, the call button is a graphical button displayed on a user interface of a mobile device, for example, the user interface 524 of the mobile device 504 illustrated and described in more detail with reference to FIG. 5. In an embodiment, the call button is located on a PIN pad as illustrated in FIG. 7D. In another embodiment, as illustrated in FIG. 8A, a call button 804 is mounted on or embedded in the AV 100.

In response to determining that a call button has been depressed, a processor of the AV 100 initiates a teleoperation call to a teleoperation server, e.g., server 136 illustrated in FIG. 1. For example, a user or a passenger (illustrated in FIG. 6E) can depress a call button if a user interface of their mobile device is not working. In another example, a passenger can depress a call button if the PIN pad 640 (illustrated in FIG. 6E) is not working to unlock the AV 100. In another example, a passenger can depress a call button if their mobile device is not available and the passenger is unable to enter the AV 100. An operator 648 assists the passenger 628 in unlocking the door of the AV 100. For example, the operator 648 assists the passenger 628 in unlocking the door of the AV 100 by causing a control signal to be sent to AV 100, the control signal configured to cause the door of AV 100 to open.

Figure 7A:
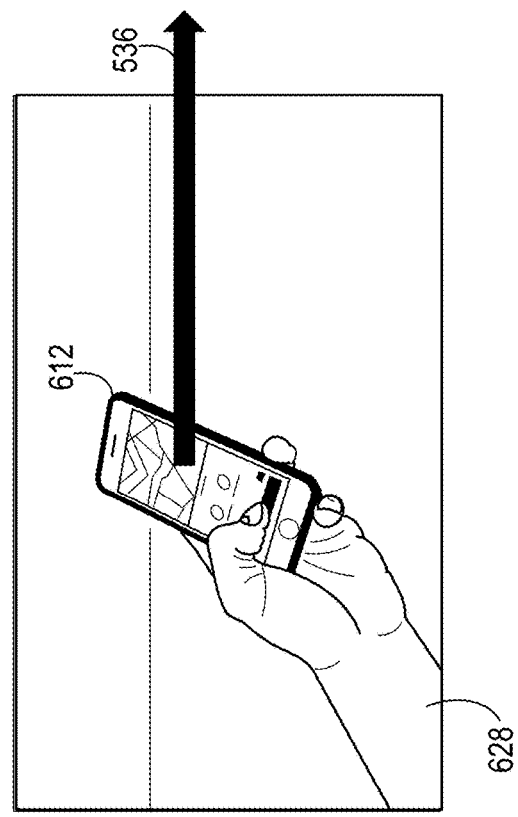
FIG. 7A is an example of passenger authentication for an AV, in accordance with one or more embodiments.
Figure 7D:
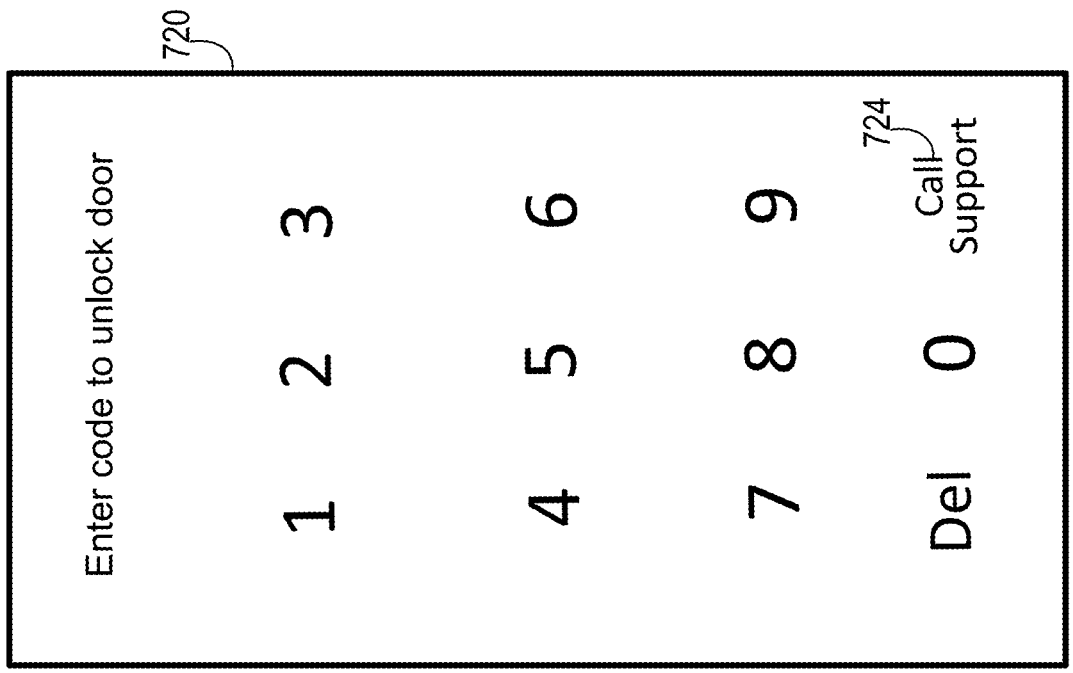
FIG. 7D is an example PIN pad for an AV, in accordance with one or more embodiments.

FIG. 7A is an example of passenger authentication for an AV. The AV is the same as or similar to the AV 100 illustrated and described in more detail with reference to FIG. 1. FIG. 7B is an example of a user interface 708 of a mobile device 612. A processor (for example, the processor 146 illustrated in FIG. 1) transmits a message 516 (shown in FIG. 7B) over a communication channel to the mobile device 612 indicating that the AV 100 (shown in FIG. 7B) has arrived at a geographical location to pick up the passenger 628. An example communication channel 608 is illustrated and described in more detail with reference to FIG. 6B. The mobile device 612 and an example geographical location 512 are illustrated and described in more detail with reference to FIG. 6B.

In an embodiment, the message 536 (shown in FIG. 7A) includes biometric information generated by the mobile device 612 at the geographical location. The biometric information is associated with (e.g., corresponds to) an identity of a user of a mobile device (e.g., mobile device 504 illustrated in FIG. 1), the passenger 628, etc. In an embodiment, the user and the passenger 628 are the same. For example, the biometric information is a fingerprint and/or image of passenger 628. The door is unlocked in response to the biometric information matching stored biometric information. In an embodiment, a processor of the AV 100 receives haptic input from a fingerprint reader of the AV 100. The fingerprint reader is an optical scanner, capacitance scanner, ultrasonic scanner, or a thermal scanner embedded on a surface of the AV 100. The fingerprint reader obtains an image of a user's fingerprint, and a processor of the AV 100 determines a match from a database. The processor determines that the haptic input is related to an identity of a user for unlocking a door of the AV 100.

In an embodiment, the AV 100 (shown in FIG. 7B) receives a message indicating that the mobile device 612 (shown in FIG. 7B) is located beyond a threshold distance of the AV 100. In response to receiving the message, a processor of the AV 100 activates a PIN pad of the AV 100 to receive a code 704 for unlocking a door of the AV 100. The PIN pad is the same as or similar to the PIN pad 640 illustrated and described in more detail with reference to FIG. 6E. The processor determines that the code is related to an identity of a user before it unlocks a door of the AV 100.

Figure 7C:
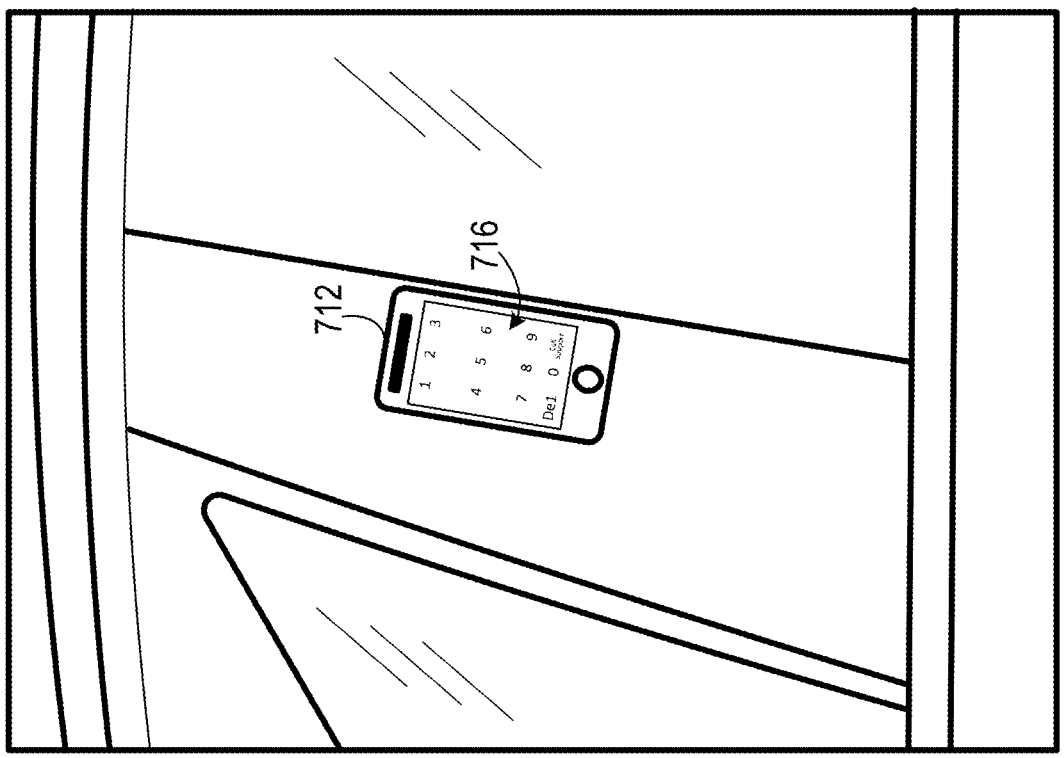
FIG. 7C is an example of passenger authentication for an AV using an embedded device, in accordance with one or more embodiments.

FIG. 7C is an example of passenger authentication for an AV using an embedded device 712. The AV is the same as or similar to the AV 100 illustrated and described in more detail with reference to FIG. 1. FIG. 7D is an example PIN pad 720 for an AV. In an embodiment, the AV receives a message from a mobile device indicating that the mobile device is located beyond a threshold distance of the AV 100. Example mobile devices 504, 612 and an example geographical location 512 are illustrated and described in more detail with reference to FIGS. 5, 6A-B. The message includes an indication that a passenger will be unable to use their mobile device to unlock the AV 100.

In response to receiving the message, the AV activates a PIN pad 716 (shown in FIG. 7C). The PIN pad 716 is embedded or mounted on the AV, as illustrated in FIG. 7C. In an embodiment, the PIN pad 716 is a graphical PIN pad displayed on a mobile device mounted on the AV or the embedded device 712. The PIN pad 716 receives haptic input from a passenger for unlocking a door of the AV. A processor of the AV converts the haptic input into an alphanumeric or digital code. The processor is the same as or similar to the processor 146 illustrated and described in more detail with reference to FIG. 1. An example alphanumeric or digital code 704 is illustrated and described in more detail with reference to FIG. 7B. The processor determines that the alphanumeric or digital code is related to the identity of a user or passenger. For example, the alphanumeric or digital code is a birth date, digits of an identification number, a portion of a phone number, or a self-selected PIN. In some embodiments, AV 100 causes the door of AV 100 to unlock based on receiving the alphanumeric or digital code as input to the PIN pad 716.

In an embodiment, for example, when a passenger is unable to unlock the AV or requires additional assistance, the AV determines that a call button 724 on a PIN pad 720 (shown in FIG. 7D) has been depressed by the passenger. In response to determining that the call button 724 has been depressed, the AV initiates a teleoperation call to a teleoperation server, for example, the server 136 illustrated and described in more detail with reference to FIG. 1. A responding service answers the teleoperation call to assist the passenger in unlocking the door of the AV, as discussed above. In an embodiment, the responding service is an operator 648, as illustrated in FIG. 6F. In an embodiment, the responding service is an automated service or a chatbot 808, as illustrated and described in more detail with reference to FIG. 8B.

A user or passenger of an AV, for example, the AV 100 illustrated and described in more detail with reference to FIG. 1, uses the PIN pad 720 to gain entry into the AV to begin a ride. In an embodiment, a passenger is unable to unlock a door of the AV using their mobile device (e.g., when the mobile device is unable to power on or the mobile device is not present). An example mobile device 504 is illustrated in more detail with reference to FIG. 5. In response, the AV activates the PIN pad 720 to receive haptic input for unlocking at least one door of the AV. The haptic input is converted into a PIN, or alphanumeric or digital code, for example the code 704 illustrated and described in more detail with reference to FIG. 7B.

The PIN pad 720 (shown in FIG. 7D) sometimes has different implementations in different embodiments. In an embodiment, the PIN pad 720 is implemented as a hardware PIN pad (e.g., built from plastic, metal, or acrylonitrile butadiene styrene (ABS)) and mounted on or embedded in the AV. In such an embodiment, the buttons of the PIN pad 720 are made of rubber, metal, or plastic. In another embodiment, the PIN pad 720 is implemented as a graphical display on an electronic touchscreen mounted on or embedded in the AV using components illustrated and described in more detail with reference to FIG. 3. In another embodiment, the PIN pad 720 is implemented as a graphical display on a mobile device, for example, the mobile device 504, illustrated and described in more detail with reference to FIG. 5. A user or passenger enters an alphanumeric or digital code into the PIN pad 720 displayed on the mobile device.

FIG. 8A is an example of passenger authentication for an AV using a call button 804, in accordance with one or more embodiments. The AV is the same as or similar to the example AV 100 illustrated and described in more detail with reference to FIG. 1. In an embodiment, the call button 804 is implemented as a hardware call button (e.g., built from plastic, metal, or ABS) and mounted on or embedded in the AV. For example, the call button 804 is mounted on or around a display 812. In such an embodiment, the call button 804 and display 812 (e.g., display housing) are made of rubber, metal, or plastic. In another embodiment, the call button 804 is implemented as a graphical display on an electronic touchscreen mounted on or embedded in the AV using components illustrated and described in more detail with reference to FIG. 3. In another embodiment, the call button 804 is implemented as a graphical display on a mobile device, for example, the mobile device 504, illustrated and described in more detail with reference to FIG. 5.

A processor of the AV, for example, the processor 146 illustrated in FIG. 1, determines that the call button 804 has been depressed. In response to determining that the call button 804 has been depressed, the processor initiates a teleoperation call to a teleoperation server, for example, the server 136 illustrated and described in more detail with reference to FIG. 1. In an embodiment where the call button 804 is implemented on a mobile device, once the call button 804 is depressed, the mobile device (e.g., mobile device 504 illustrated in FIG. 5) transmits a message to the processor instructing the processor to initiate a teleoperation call.

FIG. 8B is an example of passenger authentication for an AV using teleoperation, in accordance with one or more embodiments. The AV is the same as or similar to the AV 100 illustrated and described in more detail with reference to FIG. 1. In particular, FIG. 8B shows a responding service that can respond to a teleoperation call from the AV and offer verbal or other assistance. In an embodiment, the responding service is a teleoperator, for example, the operator 648 illustrated and described in more detail with reference to FIG. 6F. In another embodiment, the responding service is an automated service or a chatbot 808. For example, the chatbot 808 assists in authenticating a passenger based on stored data and queries that it sends to the passenger, and unlocks the door of the AV, offers further instructions, or hails another vehicle. In an embodiment, the chatbot 808 calls law enforcement or medical services if needed.

FIG. 9A is an example of passenger authentication for the AV 100 using a user interface 524 of a mobile device 504, in accordance with one or more embodiments. An embodiment of the AV 100 is illustrated and described in more detail with reference to FIG. 1. An embodiment of the user interface 524 and mobile device 504 is illustrated and described in more detail with reference to FIG. 5. In an embodiment, a processor of the AV 100 receives information over a communication channel from the mobile device 504. The processor is the same as or similar to the processor 146 illustrated and described in more detail with reference to FIG. 1. In another embodiment, the processor of the AV 100 receives the information from another mobile device, for example, the mobile device 612 illustrated and described in more detail with reference to FIG. 6B. In another embodiment, the two mobile devices referenced here are the same mobile device. The information received by the AV 100 specifies a particular time and a geographical location 512. An embodiment of the geographical location 512 is illustrated and described in more detail with reference to FIG. 5. The information causes the AV 100 to arrive at the geographical location 512 at the particular time to provide a ride to a user of the mobile device 504. An example user 508 is illustrated and described in more detail with reference to FIG. 5.

The processor of the AV 100 transmits a message 516 to one or both of the mobile devices described herein indicating that the AV 100 has arrived at the geographical location 512. An embodiment of the message 516 is illustrated and described in more detail with reference to FIG. 5. The message 516 includes or is associate with a graphical icon 904 representing the AV 100. Another embodiment of the graphical icon 904 is illustrated and described as the example graphical icon 520 in more detail with reference to FIG. 5. The graphical icon 904 is displayed on a user interface 524 of one or both of the mobile devices described herein. In an embodiment, the user interface 524 displays instructions 908 to a user of the mobile device 504 to unlock the AV 100. For example, FIG. 9A shows that the graphical icon 904 resembles an "unlock" symbol and the instructions 908 state that the user of the mobile device 504 should drag or slide the graphical icon 904 to the right.

A processor of the AV 100 receives a message 536 from one or both of the mobile devices described herein. The message 536 is illustrated and described in more detail with reference to FIG. 5. The message 536 indicates that the graphical icon 904 was dragged across the user interface 524. In response to receiving the message 536, the processor of the AV 100 unlocks at least one door of the AV 100 using a control circuit of the AV 100. An example control circuit 406 is illustrated and described in more detail with reference to FIG. 4.

In an embodiment, a processor determines that one or both of the mobile devices described herein are located within a threshold distance of the geographical location 512. In this embodiment, unlocking of an AV door is performed in response to determining that one or both of the mobile devices are located within the threshold distance of the geographical location 512. In an embodiment, the threshold distance is 1-3 feet, such that the door is unlocked only when a user of one of the mobile devices described herein is capable of opening the AV door.

FIG. 9B is an example of passenger authentication for an AV 100 using a display 912, in accordance with one or more embodiments. The AV is the same as or similar to the AV 100 illustrated and described in more detail with reference to FIG. 1. The display 912 is implemented using the components discussed in FIG. 3 such as, for example, the display 312. The display 912 is embedded on or mounted to the AV 100. In an embodiment, to unlock a door of the AV, a user at a geographical location walks up to the AV and enters a PIN, or alphanumeric or digital code on an entry field of the display 912. An example geographical location 512 is illustrated and described in more detail with reference to FIG. 5. An example digital code 704 is illustrated and described in more detail with reference to FIG. 7B. The AV displays a message 916 saying that a door has been unlocked. In another embodiment, the message 916 is displayed on a user interface of a mobile device to inform a user that the door is unlocked. An example mobile device 504 and an example user interface 524 are illustrated and described in more detail with reference to FIG. 5.

In some embodiments, the door of the AV 100 is unlocked based on a signal from, for example an internal sensor. In one example of such a configuration, the AV 100 is operating a carpool where a particular passenger is intended to be the second passenger to be picked up. A processor (e.g., processor 146) of the AV 100 detects a signal from at least one sensor of the AV 100. An example sensor 121 is illustrated and described in more detail with reference to FIG. 1. The signal indicates that at least one seat in the AV 100 is occupied. Unlocking a door of the AV 100 is performed in response to detecting the signal from the sensor. For example, the sensor can be a pressure transducer that converts pressure measured from the seat into an electrical or digital signal.

In another example of use of an internal sensor, the internal sensor (e.g., a pressure transducer or some other sensor) is used to identify an emergency situation within the AV 100. For example, if the sensor is a pressure transducer, than absence of the signal (which indicates that a seat is unoccupied) can indicate an abnormal condition or emergency in a situation where occupancy of the seat is expected by the processor 146 of the AV 100. For example, if a first passenger who is supposed to be seated in the seat has fainted and fallen out of their seat, then the sensor will not generate the "occupied" signal. In such an event, the AV 100 can initiate a teleoperation call or another emergency operation before letting the particular passenger in.

It will be understood that the carpool or emergency situation examples are intended as high level examples of use of an internal sensor to unlock the door of the AV 100. Other examples or situations can be monitored by other sensors such as a heat sensor, a humidity sensor, a visual sensor (e.g., a motion-detection camera), or some other type of sensor.

Figure 10:
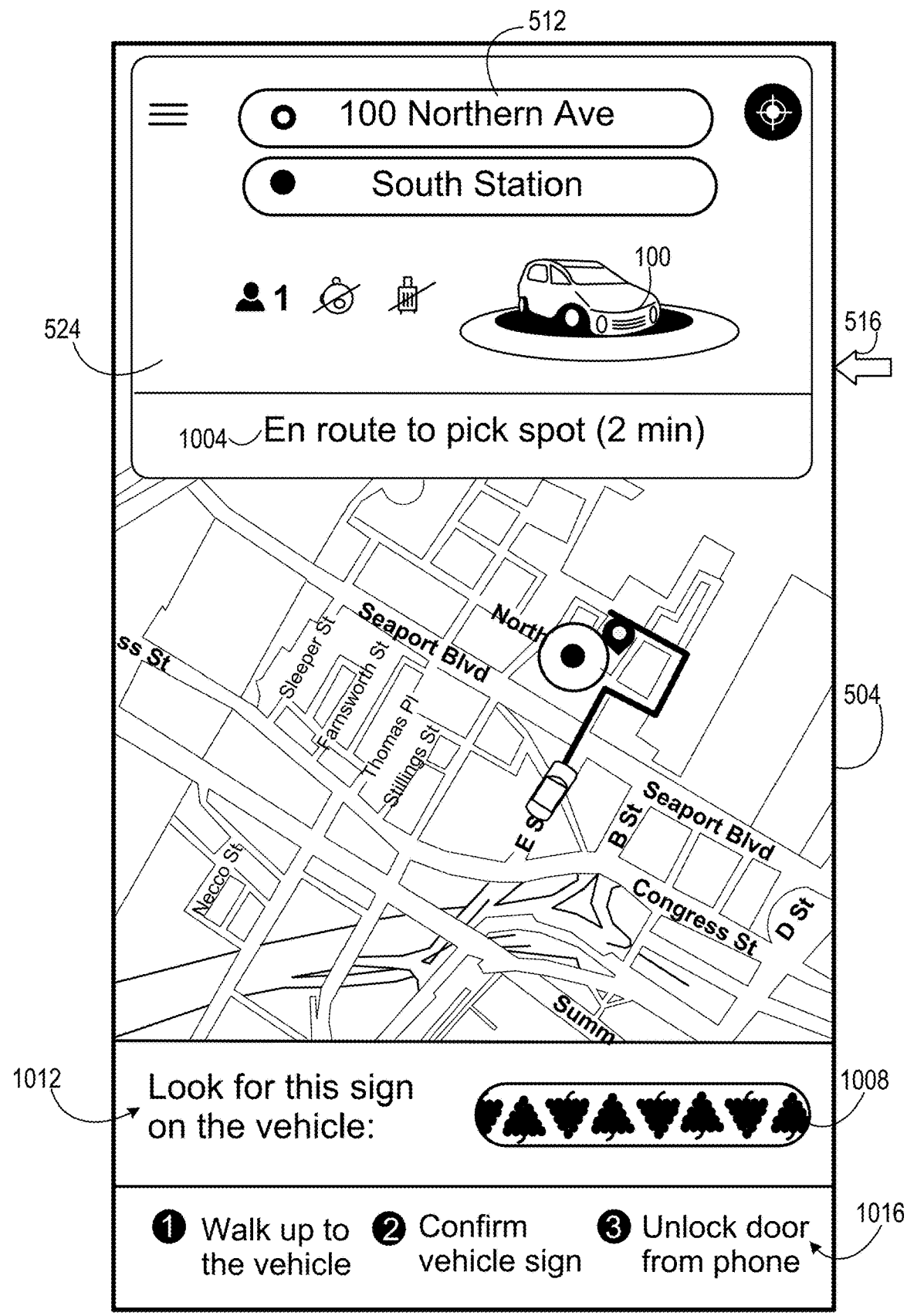
FIG. 10 is an example of passenger authentication for an AV using a user interface of a mobile device, in accordance with one or more embodiments.

FIG. 10 is an example of passenger authentication for the AV 100 using a user interface 524 of a mobile device 504, in accordance with one or more embodiments. The AV 100 is illustrated and described in more detail with reference to FIG. 1. The user interface 524 and the mobile device 504 are illustrated and described in more detail with reference to FIG. 5. In an embodiment, the mobile device 504 is used to hail the AV 100 and a different mobile device, for example, the mobile device 612 illustrated in FIG. 6B, is used at the geographical location 512 to unlock the AV 100.

The AV 100 receives information over a communication channel from the mobile device 504. An example communication channel 604 is illustrated and described in more detail with reference to FIG. 6A. The information specifies a particular time and a geographical location 512. The geographical location 512 is illustrated and described in more detail with reference to FIG. 6B. For example, the geographical location 512 denotes a start point (e.g., source location or initial location) for a ride in the AV 100. An example start point 904 is illustrated and described in more detail with reference to FIG. 9. The information causes the AV 100 to arrive at the geographical location 512 at the time requested.

A processor of the AV 100 transmits a message 1004 to the mobile device 504 prior to arriving at the geographical location 512. The processor is the same as or similar to the processor 146 illustrated and described in more detail with reference to FIG. 1. For example, the processor transmits the message 1004 to the mobile device 504 when the AV 100 is a few minutes away from the geographical location 512, alerting the user of the mobile device 504 to the impending arrival of the AV 100.

The processor transmits the message 516 to the mobile device 504 indicating that the AV 100 has arrived at the geographical location 512. The message 516 is illustrated and described in more detail with reference to FIG. 5. The message 516 includes or is associated with a graphical icon 1008 associated with (e.g., corresponding to) the AV 100. Another embodiment of the graphical icon is illustrated and described as graphical icon 520 in more detail with reference to FIG. 5. In an embodiment, the message 516 includes instructions 1012 for display on the user interface 524 of the mobile device 504. For example, the instructions 1012 direct a user of the mobile device 504 to find the AV assigned to the user (AV 100) by looking for the graphical icon 1008 on the side of the AV 100. For example, the graphical icon 1008 is painted on a side of the AV 100, stuck on the AV 100, or displayed on an electronic display embedded on the AV 100.

In an embodiment, the message 516 includes instructions 1016 for display on the user interface 524 of the mobile device 504. For example, the instructions 1016 instruct a user of the mobile device 504 on how to unlock the AV 100 using the mobile device 504. In an embodiment, the graphical icon 1008 need not resemble the AV 100. For example, as shown in FIG. 10, the graphical icon 1008 is a geometric shape associated with the AV 100, such that the AV 100 can be differentiated from another AV that is associated with another icon. The graphical icon 1008 is displayed on the user interface 524 of the mobile device 504. The instructions 1016 (displayed on the user interface 524) instruct a user of the mobile device 504 to drag the graphical icon 1008 across the user interface 524 into a graphical receptacle displayed on the user interface 524 to unlock a door of the AV 100. An example graphical receptacle 532 is illustrated and described in more detail with reference to FIG. 5.

Processes for Passenger Authentication and Entry for Autonomous Vehicles

Figure 11:
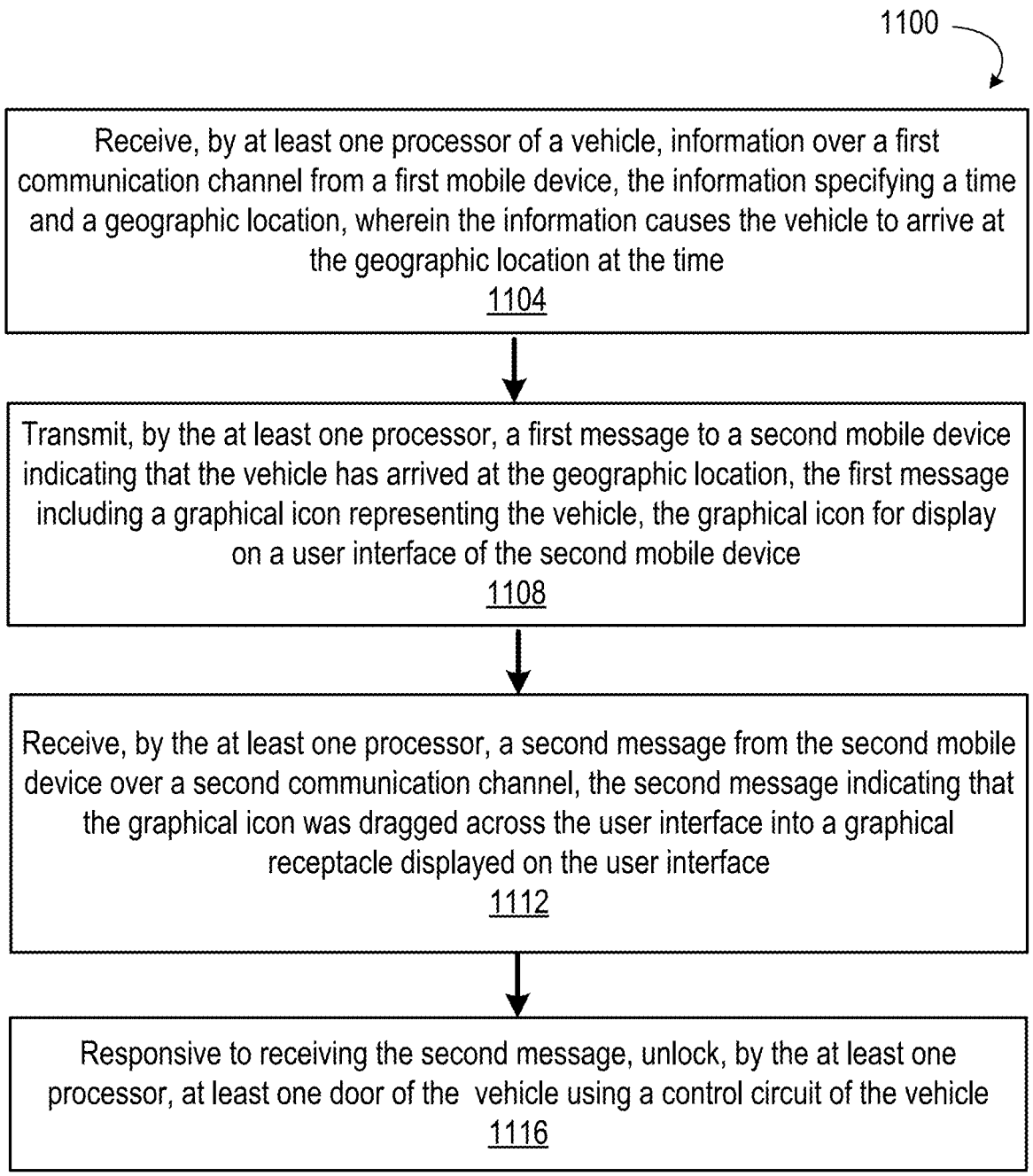
FIG. 11 is a flow diagram illustrating an example process for passenger authentication and entry for an AV, in accordance with one or more embodiments.

FIG. 11 is a flow diagram illustrating an example process 1100 for passenger authentication and entry for an AV, in accordance with one or more embodiments. The AV is the same as or similar to the AV 100 illustrated and described in more detail with reference to FIG. 1. In an embodiment, the process 1100 of FIG. 11 is performed by a vehicle controller. Other entities, for example, a planning module or control circuit of the AV perform some or all of the steps of the process 1100 in other embodiments. An example planning module 404 and an example control circuit 406 are illustrated and described in more detail with reference to FIG. 4. Likewise, embodiments may include different and/or additional steps, or perform the steps in different orders.

At least one processor of the AV receives (1104) information over a first communication channel from a first mobile device. The processor is the same as or similar to the processor 146 illustrated and described in more detail with reference to FIG. 1. The first communication channel is the same as or similar to the communication channel 604 illustrated and described in more detail with reference to FIG. 6A. The first mobile device is the same as or similar to the mobile device 504 illustrated and described in more detail with reference to FIG. 5. The information specifies a particular time and a geographical location. The geographical location is the same as or similar to the geographical location 512 illustrated and described in more detail with reference to FIG. 5. the information causes the AV to arrive at the geographical location at the time.

The processor transmits (1108) a first message to a second mobile device indicating that the AV has arrived at the geographical location. An example first message 516 is illustrated and described in more detail with reference to FIG. 5. An example second mobile device 612 is illustrated and described in more detail with reference to FIG. 6B. In an embodiment, the first mobile device is the second mobile device. The first mobile device includes or is associated with a graphical icon representing the AV. An example graphical icon 520 is illustrated and described in more detail with reference to FIG. 5. The graphical icon is for display on a user interface of the second mobile device. An example user interface 524 is illustrated and described in more detail with reference to FIG. 5. In an embodiment, the processor determines that a call button has been depressed. An example call button 1604 is illustrated and described in more detail with reference to FIG. 16A. In response to determining that the call button has been depressed, the processor initiates a teleoperation call to a teleoperation server, for example, the server 136 illustrated and described in more detail with reference to FIG. 1.

The processor receives (1112) a second message from the second mobile device over a second communication channel. An example second message 536 is illustrated and described in more detail with reference to FIG. 5. An example second communication channel 608 is illustrated and described in more detail with reference to FIG. 6B. In an embodiment, the first communication channel is the second communication channel. In an embodiment, the first communication channel is a long-range wireless communication channel and the second communication channel is a short-range wireless communication channel. The second message indicates that the graphical icon was dragged across the user interface into a graphical receptacle displayed on the user interface. An example graphical receptacle 532 is illustrated and described in more detail with reference to FIG. 5.

In an embodiment, the second message includes biometric information generated by one or both of the mobile devices described herein. The biometric information is related to an identity of a user of one or both of the mobile devices. In an embodiment, the processor captures at least one image using a camera of the AV. Example cameras are illustrated and described in more detail with reference to FIGS. 1, 5, 7. The processor determines that the image is related to an identity of a user of one or both of the mobile devices for unlocking a door of the AV. In an embodiment, security is increased by analyzing an audio signal captured using at least one microphone of the AV 100. An example microphone 620 is illustrated and described in more detail with reference to FIG. 6B. The processor determines that the audio signal is related to an identity of a user of one or both of the mobile devices for unlocking a door of the AV 100.

In response to receiving the second message, the processor unlocks (1116) at least one door of the AV using a control circuit of the AV 100. The control circuit is the same as or similar to the control circuit 406 illustrated and described in more detail with reference to FIG. 4. In an embodiment, the processor determines that one or both of the mobile devices is located within a threshold distance of the geographical location. Unlocking the door is performed responsive to determining that one or both of the mobile devices is located within the threshold distance of the geographical location. In an embodiment, the processor receives a message indicating that one or both of the mobile devices is located beyond a threshold distance of the geographical location. In response to receiving the message, the processor activates a PIN pad of the AV to receive input (e.g., haptic input, touch-capacitive input, and/or the like) for unlocking a door of the AV. An example PIN pad 640 is illustrated and described in more detail with reference to FIG. 6E. In an embodiment, the processor converts the haptic input into an alphanumeric or digital code, for example, the code 704 illustrated and described in more detail with reference to FIG. 7B. In an embodiment, the processor determines that the alphanumeric or digital code is related to an identity of a user or a passenger for unlocking a door of the AV.

In an embodiment, the processor detects a signal from at least one sensor of the AV. An example sensor 121 is illustrated and described in more detail with reference to FIG. 1. The signal indicates that at least one seat in the AV is occupied. Unlocking the at least one door of the AV is performed responsive to detecting the signal from the sensor. In an embodiment, the processor receives haptic input from a fingerprint reader of the AV. The processor determines that the haptic input is related to an identity of a user for unlocking a door of the AV. In an embodiment, a QR scanner of the AV scans a QR code displayed on one or both of the mobile devices described herein. An example QR scanner 632 and QR code 636 are illustrated and described in more detail with reference to FIG. 6D. The processor determines that the QR code is related to an identity of a user for unlocking the door of the AV.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
receiving, by at least one processor of a vehicle, information over a first communication channel from a first mobile device, the information specifying a time and a geographical location, wherein the information causes the vehicle to arrive at the geographical location at the time;
transmitting, by the at least one processor, a first message to a second mobile device indicating that the vehicle has arrived at the geographical location, the first message comprising a graphical icon representing the vehicle, the graphical icon for display on a user interface of the second mobile device;
receiving, by the at least one processor, a second message from the second mobile device over a second communication channel, the second message indicating that the graphical icon was dragged across the user interface into a graphical receptacle displayed on the user interface; and
responsive to receiving the second message, unlocking, by the at least one processor, at least one door of the vehicle using a control circuit of the vehicle.

2. The method of claim 1, further comprising:
receiving, by the at least one processor, a third message over the first communication channel from the first mobile device, the third message indicating that the second mobile device is located beyond a threshold distance of the geographical location; and
responsive to receiving the third message, activating, by the at least one processor, a personal identification number (PIN) pad of the vehicle to receive haptic input for unlocking the at least one door of the vehicle.

3. The method of claim 2, further comprising:
converting, by the at least one processor, the haptic input into an alphanumeric or digital code; and
determining, by the at least one processor, that the alphanumeric or digital code is related to an identity of a user, the alphanumeric or digital code for unlocking the at least one door of the vehicle.

4. The method of claim 1, further comprising:
determining, by the at least one processor, that the second mobile device is located within a threshold distance of the geographical location, wherein unlocking of the at least one door is performed responsive to determining that the second mobile device is located within the threshold distance of the geographical location.

5. The method of claim 1, further comprising:
determining, by the at least one processor, that a call button of the vehicle has been depressed; and
responsive to determining that the call button of the vehicle has been depressed, initiating, by the at least one processor, a teleoperation call to a teleoperation server.

6. The method of claim 1, wherein the second message includes biometric information generated by the second mobile device at the geographical location, the biometric information related to an identity of a user.

7. The method of claim 1, further comprising:
capturing, by the at least one processor, at least one image using a camera of the vehicle; and
determining, by the at least one processor, that the at least one image is related to an identity of a user for unlocking the at least one door of the vehicle.

8. The method of claim 1, further comprising:
analyzing, by the at least one processor, an audio signal captured using at least one microphone of the vehicle; and
determining, by the at least one processor, that the audio signal is related to an identity of a user for unlocking the at least one door of the vehicle.

9. The method of claim 1, further comprising:
detecting, by the at least one processor, a signal from at least one sensor of the vehicle, the signal indicating that at least one seat in the vehicle is occupied, wherein unlocking the at least one door of the vehicle is performed responsive to detecting the signal from the at least one sensor.

10. The method of claim 1, wherein the first communication channel comprises a cellular communication channel and the second communication channel comprises at least one of a Bluetooth communication channel or a near field communication channel.

11. The method of claim 1, further comprising:
receiving, by the at least one processor, haptic input from a fingerprint reader of the vehicle; and
determining, by the at least one processor, that the haptic input is related to an identity of a user for unlocking the at least one door of the vehicle.

12. The method of claim 1, further comprising:
scanning, by a QR scanner of the vehicle, a QR code displayed on the second mobile device;

determining, by the at least one processor, that the QR code is related to an identity of a user for unlocking the at least one door of the vehicle.

13. The method of claim 1, wherein the first mobile device is the second mobile device.

14. The method of claim 1, wherein the first communication channel is the second communication channel.

15. A vehicle comprising:
at least one computer processor; and
at least one non-transitory storage medium storing instructions which, when executed by the at least one computer processor, cause the at least one computer processor to:
receive information over a first communication channel from a first mobile device, the information specifying a time and a geographical location, wherein the information causes the vehicle to arrive at the geographical location at the time;
transmit a first message to a second mobile device indicating that the vehicle has arrived at the geographical location, the first message comprising a graphical icon representing the vehicle, the graphical icon for display on a user interface of the second mobile device;
receive a second message from the second mobile device over a second communication channel different from the first communication channel, the second message indicating that the graphical icon was dragged across the user interface into a graphical receptacle displayed on the user interface; and
responsive to receiving the second message, unlock at least one door of the vehicle using a control circuit of the vehicle.

16. The vehicle of claim 15, wherein the instructions which, when executed by the at least one computer processor, further cause the at least one computer processor to:
receive a third message over the first communication channel from the first mobile device, the third message indicating that the first mobile device is located beyond a threshold distance of the geographical location; and
responsive to receiving the third message, activate a personal identification number (PIN) pad of the vehicle to receive haptic input for unlocking the at least one door of the vehicle.

17. The vehicle of claim 16, wherein the instructions which, when executed by the at least one computer processor, further cause the at least one computer processor to:
convert the haptic input into an alphanumeric or digital code; and
that the alphanumeric or digital code is related to an identity of a user, the alphanumeric or digital code for unlocking the at least one door of the vehicle.

18. At least one non-transitory storage media storing instructions which, when executed by at least one computing device, cause the at least one computing device to:
receive information over a first communication channel from a first mobile device, the information specifying a time and a geographical location, wherein the information causes the vehicle to arrive at the geographical location at the time;
transmit a first message to a second mobile device indicating that the vehicle has arrived at the geographical location, the first message comprising a graphical icon representing the vehicle, the graphical icon for display on a user interface of the second mobile device;
receive a second message from the second mobile device over a second communication channel different from the first communication channel, the second message indicating that the graphical icon was dragged across the user interface into a graphical receptacle displayed on the user interface; and
responsive to receiving the second message, unlock at least one door of the vehicle using a control circuit of the vehicle.

19. The at least one non-transitory storage media of claim 18, wherein the instructions which, when executed by the at least one computing device, further cause the at least one computing device to:
receive a third message over the first communication channel from the first mobile device, the third message indicating that the first mobile device is located beyond a threshold distance of the geographical location; and
responsive to receiving the third message, activate a personal identification number (PIN) pad of the vehicle to receive haptic input for unlocking the at least one door of the vehicle.

20. The at least one non-transitory storage media of claim 19, wherein the instructions which, when executed by the at least one computing device, further cause the at least one computing device to:
convert the haptic input into an alphanumeric or digital code; and
determine that the alphanumeric or digital code is related to an identity of a user, the alphanumeric or digital code for unlocking the at least one door of the vehicle.

* * * * *